US008841991B2

(12) United States Patent
Anabuki et al.

(10) Patent No.: US 8,841,991 B2
(45) Date of Patent: Sep. 23, 2014

(54) INFORMATION PROCESSING APPARATUS AND INFORMATION PROCESSING METHOD

(71) Applicant: Canon Kabushiki Kaisha, Tokyo (JP)

(72) Inventors: Mahoro Anabuki, Yokohama (JP); Atsushi Nogami, Tokyo (JP); Tetsuri Sonoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/749,080

(22) Filed: Jan. 24, 2013

(65) Prior Publication Data

US 2013/0135087 A1    May 30, 2013

Related U.S. Application Data

(63) Continuation of application No. 12/563,053, filed on Sep. 18, 2009, now Pat. No. 8,368,521.

(30) Foreign Application Priority Data

Oct. 1, 2008  (JP) ................................. 2008-256638

(51) Int. Cl.
  *H04B 3/36*   (2006.01)
  *G06F 3/0354* (2013.01)
  *G09B 21/00*  (2006.01)
  *G06F 3/01*   (2006.01)

(52) U.S. Cl.
  CPC .............. *H04B 3/36* (2013.01); *G06F 3/03547* (2013.01); *G09B 21/003* (2013.01); *G06F 3/016* (2013.01)
  USPC ............... 340/407.1; 340/815.45; 340/815.79

(58) Field of Classification Search
  USPC .................. 340/407.1, 407.2, 815.4, 815.45, 340/815.68, 815.79
  See application file for complete search history.

(56) References Cited

U.S. PATENT DOCUMENTS

| 4,279,088 A | 7/1981 | Hyre |
| 4,876,534 A | 10/1989 | Mead et al. |
| 5,259,390 A | 11/1993 | MacLean |

(Continued)

FOREIGN PATENT DOCUMENTS

| JP | 2003-199974 | 7/2003 |
| JP | 2005-100465 | 4/2005 |
| JP | 2005-175815 | 6/2005 |

OTHER PUBLICATIONS

Tomohiro Amemiya, et al., Perceptual Attraction Force: Exploit the Nonlinearlity of Human Haptic Perception, NTT Communication Science Laboratories, In ACM SIGGRAPH 2006 Sketches, Jul. 2006, p. 40, Boston, MA.

(Continued)

*Primary Examiner* — Daniel Previl
(74) *Attorney, Agent, or Firm* — Fitzpatrick, Cella, Harper & Scinto

(57) ABSTRACT

Contact detection units are attached to an information transfer device in a predetermined arrangement pattern to detect contact with a human body. Presentation units are attached to the information transfer device in a predetermined arrangement pattern to present a tactile stimulus. A contact detection unit that has detected contact is specified. Based on the arrangement distribution of the specified contact detection unit and a type of information to be presented via a tactile stimulus, a presentation unit to be driven is specified. The specified presentation unit is driven and controlled.

22 Claims, 20 Drawing Sheets

(56) References Cited

U.S. PATENT DOCUMENTS

| | | | |
|---|---|---|---|
| 6,556,860 B1* | 4/2003 | Groenewegen | 600/509 |
| 6,618,037 B2* | 9/2003 | Sakamaki et al. | 345/163 |
| 7,560,826 B2 | 7/2009 | Hijikata et al. | |
| 8,106,893 B2* | 1/2012 | Fujita et al. | 345/178 |
| 8,225,494 B2* | 7/2012 | Lauzier et al. | 29/714 |
| 8,368,521 B2* | 2/2013 | Anabuki et al. | 340/407.1 |
| 2005/0110758 A1* | 5/2005 | Kyung et al. | 345/163 |
| 2009/0036212 A1 | 2/2009 | Provancher | |
| 2009/0080490 A1* | 3/2009 | Mowry, Jr. et al. | 374/1 |
| 2011/0155044 A1* | 6/2011 | Burch et al. | 116/205 |

OTHER PUBLICATIONS

Holger Regenbrecht, et al., Virtual Reality Aided Assembly with Directional Vibro-Tactile Feedback, In. Proc. Graphite 2005, pp. 381-387.

* cited by examiner

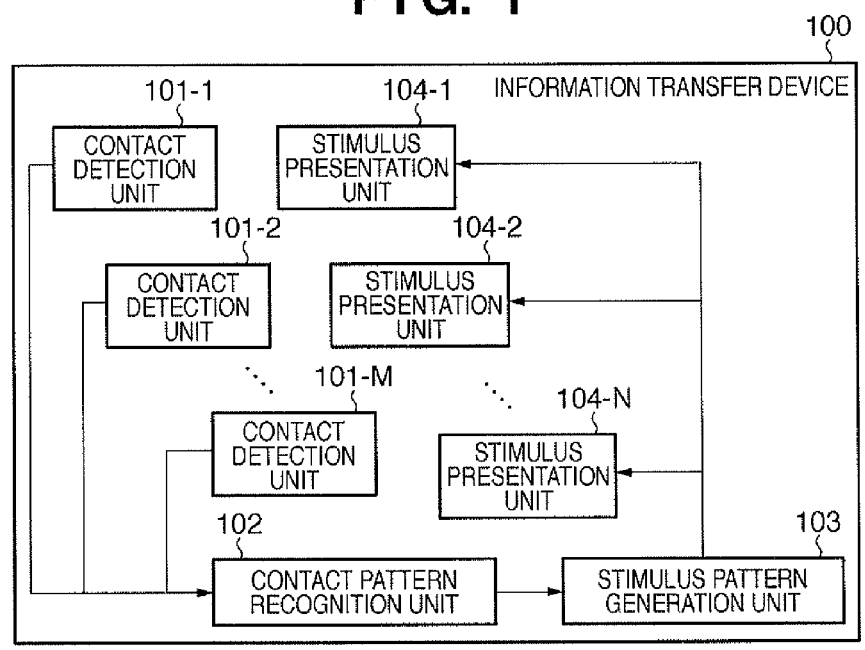
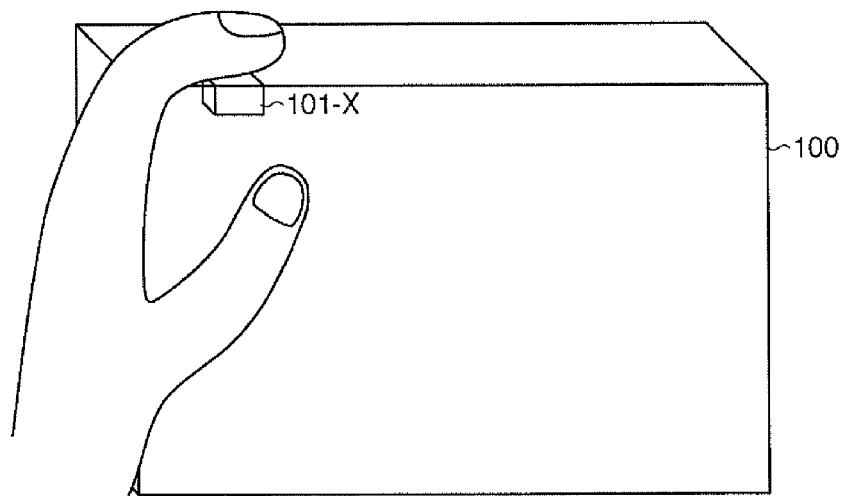

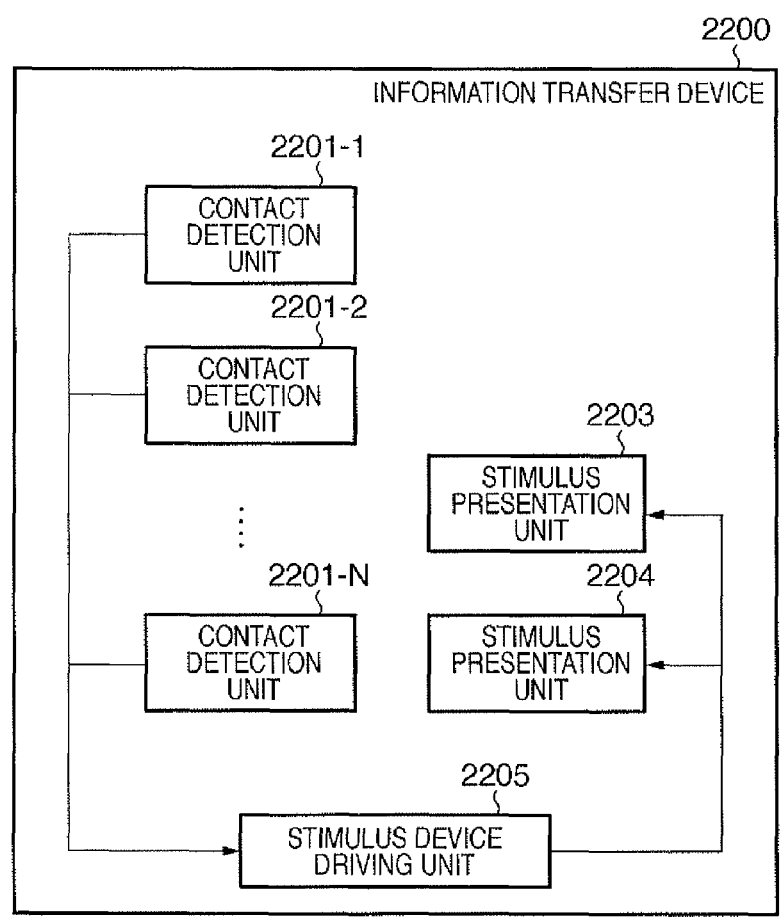
F I G. 22

INFORMATION PROCESSING APPARATUS AND INFORMATION PROCESSING METHOD

This application is a continuation of U.S. patent application Ser. No. 12/563,053, which was filed Sep. 18, 2009, the contents of which are incorporated herein by reference.

BACKGROUND OF THE INVENTION

1. Field of the Invention

The present invention relates to a technique of presenting a tactile stimulus to a user to notify him/her of information.

2. Description of the Related Art

CPUs having improved throughput and miniaturization of various kinds of devices are accelerating downsizing of general-purpose information terminals represented by a PC and sophistication of mobile information terminals represented by a cellular phone. Even a small single-function device such as a barcode reader behaves as a simple information terminal capable of information operation to some degree by having a high-level information processing function or communication function.

Downsizing information terminals or converting small single-function devices into information terminals enables to widen their use range. However, since the physical size of the information transfer area is small, information input or interpretation of output information is more difficult than before the downsizing or conversion into information terminals. Under these circumstances, how to input or output information without difficulty using a small device has widely been examined.

When visually outputting information, as the information presentation area becomes smaller, the visually output information is harder to recognize, and the efficiency lowers in the nature of the device. A widely known information presentation method oriented to small devices and, more particularly, to handheld devices tactilely presents information. For example, many cellular phones present information of an incoming call or the like by vibration.

According to a technique disclosed in patent reference 1, a plurality of oscillators are attached to a handheld device. The device presents information of a direction by presenting a sense of direction based on a vibration pattern of the oscillators.

[Patent reference 1] Japanese Patent Laid-Open No. 2003-199974

A technique disclosed in patent reference 2 generates a sense of torque using a gyroscope, thereby presenting information of the moving direction of a handheld device.

[Patent reference 2] Japanese Patent Laid-Open No. 2005-100465

Non-patent reference 1 discloses a technique of attaching a plurality of oscillators to the handle of a handheld device and presenting a direction to move the handle by the position of an oscillator that vibrates.

[Non-patent reference 1] Holger Regenbrecht, et al., Virtual Reality Aided Assembly with Directional Vibro-Tactile Feedback, In Proc. GRAPHITE 2005, pp. 381-387, 2005.

Non-patent reference 2 discloses a technique of presenting information of a moving direction by a spurious tractive force generated by a temporally asymmetrical back-and-forth motion of an object.

[Non-patent reference 2] Tomohiro Amemiya, Hideyuki Ando, Taro Maeda, "Perceptual Attraction Force: Exploit the Nonlinearity of Human Haptic Perception", In Proc. of ACM SIGGRAPH 2006 Sketches, p. 40, Boston, Mass., July 2006.

A tactile stimulus generated by the methods according to these techniques has been put into practical use for information transfer/presentation by small devices in combination with visual information presentation.

However, to use a tactile stimulus for information transfer (information acquisition) in the prior arts, a body part needs to be as supposed in contact with a preset specific portion (stimulus presentation unit) for presenting a stimulus. This may lead to a failure in correctly outputting information to the user depending on how he/she touches the portion.

More specifically, if the body is not in contact with the tactile stimulus presentation unit at all, no information is transferred. If the body is in contact with only part of the stimulus presentation unit, the user recognizes the information wrong.

There can exist a lot of patterns of user's information terminal holding style depending on his/her state or an action to be executed. In the prior arts, however, it is difficult to transfer information to the user while flexibly coping with the various holding styles.

SUMMARY OF THE INVENTION

The present invention has been made in consideration of the above-described problems, and provides a technique that enables to apply, for various uses, a technique of notifying a user of information based on a tactile stimulus.

According to the first aspect of the present invention, an information processing apparatus comprising: a plurality of sensor units which are attached to the information processing apparatus in a predetermined arrangement pattern to detect direct/indirect contact; a plurality of presentation units which are attached to the information processing apparatus in a predetermined arrangement pattern to present a tactile stimulus; a first specifying unit which specifies, out of said plurality of sensor units, a sensor unit that has detected direct/indirect contact; a second specifying unit which specifies, based on an arrangement distribution of the sensor unit specified by said first specifying unit and a type of information to be presented via a tactile stimulus, a presentation unit to be driven out of said plurality of presentation units; and a control unit which drives and controls the presentation unit specified by said second specifying unit.

According to the second aspect of the present invention, an information processing apparatus comprising: a plurality of sensor units which are attached to the information processing apparatus in a predetermined arrangement pattern to detect direct/indirect contact; a plurality of presentation units which are attached to the information processing apparatus in a predetermined arrangement pattern to present a tactile stimulus; a first specifying unit which specifies, out of said plurality of sensor units, a sensor unit that has detected direct/indirect contact; a second specifying unit which specifies, out of said plurality of presentation units, a presentation unit corresponding to the sensor unit specified by said first specifying unit; and a control unit which drives and controls the presentation unit specified by said second specifying unit to generate a preset stimulus pattern to express information to be presented to a user.

According to the third aspect of the present invention, an information processing method performed by an information processing apparatus including: a plurality of sensor units which are attached to the information processing apparatus in a predetermined arrangement pattern to detect direct/indirect contact; and a plurality of presentation units which are attached to the information processing apparatus in a predetermined arrangement pattern to present a tactile stimulus, comprising: a first specifying step of specifying, out of the plurality of sensor units, a sensor unit that has detected direct/indirect contact; a second specifying step of specifying, based on an arrangement distribution of the sensor unit specified in the first specifying step and a type of information to be presented via a tactile stimulus, a presentation unit to be driven out of the plurality of presentation units; and a control step of driving and controlling the presentation unit specified in the second specifying step.

According to the fourth aspect of the present invention, an information processing method performed by an information processing apparatus including: a plurality of sensor units which are attached to the information processing apparatus in a predetermined arrangement pattern to detect direct/indirect contact; and a plurality of presentation units which are attached to the information processing apparatus in a predetermined arrangement pattern to present a tactile stimulus, comprising: a first specifying step of specifying, out of the plurality of sensor units, a sensor unit that has detected direct/indirect contact; a second specifying step of specifying, out of the plurality of presentation units, a presentation unit corresponding to the sensor unit specified in the first specifying step; and a control step of driving and controlling the presentation unit specified in the second specifying step to generate a preset stimulus pattern to express information to be presented to a user.

According to the fifth aspect of the present invention, an information processing apparatus for transferring predetermined information via a tactile stimulus, comprising: a first contact detection unit; a second contact detection unit; a first stimulus presentation unit; a second stimulus presentation unit; and a stimulus device driving unit which drives said first stimulus presentation unit and said second stimulus presentation unit, wherein when said first contact detection unit and said second contact detection unit have detected contact, said stimulus device driving unit drives said first stimulus presentation unit based on a first driving pattern that expresses the predetermined information and said second stimulus presentation unit based on a second driving pattern that expresses the predetermined information, and when only said first contact detection unit has detected contact, said stimulus device driving unit drives said first stimulus presentation unit based on a third driving pattern that expresses the predetermined information.

According to the sixth aspect of the present invention, an information processing method performed by an information processing apparatus for transferring predetermined information via a tactile stimulus, the information processing apparatus including: a first contact detection unit; a second contact detection unit; a first stimulus presentation unit; a second stimulus presentation unit; and a stimulus device driving unit which drives the first stimulus presentation unit and the second stimulus presentation unit, comprising when the first contact detection unit and the second contact detection unit have detected contact, causing the stimulus device driving unit to drive the first stimulus presentation unit based on a first driving pattern that expresses the predetermined information and the second stimulus presentation unit based on a second driving pattern that expresses the predetermined information, and when only the first contact detection unit has detected contact, causing the stimulus device driving unit to drive the first stimulus presentation unit based on a third driving pattern that expresses the predetermined information.

Further features of the present invention will become apparent from the following description of exemplary embodiments with reference to the attached drawings.

BRIEF DESCRIPTION OF THE DRAWINGS

FIG. 1 is a block diagram showing an example of the functional arrangement of an information transfer device according to the first embodiment of the present invention;

FIG. 2 is a view showing a state in which a finger that is a part of a user's body is in contact with a contact detection unit 101-x (one of contact detection units 101-1 to 101-M) arranged on the surface of an information transfer device 100;

FIG. 22 is a block diagram showing an example of the functional arrangement of an information transfer device 2200 according to the fourth embodiment of the present invention;

DESCRIPTION OF THE EMBODIMENTS

Figure 3:
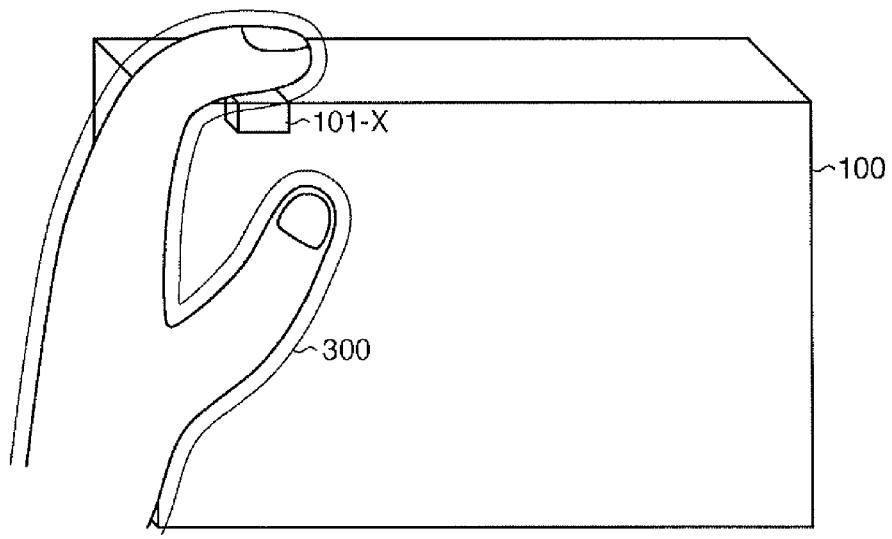
FIG. 3 is a view showing a state in which a gloved hand 300 is in contact with the contact detection unit 101-x.

The embodiments of the present invention will now be described in detail with reference to the accompanying drawings. Note that the embodiments will be explained here as mere examples of the arrangement of the present invention defined in the appended claims, and the present invention is not limited to the individual embodiments to be described below.

First Embodiment

An information processing apparatus according to this embodiment is an information transfer device which is gripped and operated by a user, and has a function of presenting information to the user based on a tactile stimulus. This information transfer device is, for example, a digital camera or an ultrasonic probe a user can hold in hands and operate. Using a tactile stimulus, the device notifies the user of, e.g., operation navigation information representing how to move the information transfer device, a processing result output from the information transfer device in response to a user input, and information of some kind the information transfer device has externally acquired by measurement or communication.

The information transfer device will be described below in more detail.

<Arrangement of Information Transfer Device>

FIG. 1 is a block diagram showing an example of the functional arrangement of an information transfer device according to this embodiment. As shown in FIG. 1, an information transfer device 100 according to this embodiment includes a plurality of contact detection units 101-1 to 101-M, a plurality of stimulus presentation units 104-1 to 104-N, a contact pattern recognition unit 102, and a stimulus pattern generation unit 103.

The plurality of contact detection units 101-1 to 101-M are arranged on or inside the information transfer device 100 in a predetermined arrangement pattern. Each of the plurality of contact detection units 101-1 to 101-M detects direct/indirect contact with the user and outputs the detection result (a signal value representing presence/absence of direct/indirect contact) to the contact pattern recognition unit 102. Each of the plurality of contact detection units 101-1 to 101-M is formed from, e.g., a sensor unit such as a capacitor sensor, an optical sensor, a pressure sensor, or a strain sensor. When the output value from the sensor unit exceeds a predetermined threshold, the contact pattern recognition unit 102 detects the presence of contact. Note that the contact detection units 101-1 to 101-M may not only output the detection result of the presence/absence of contact but also detect a degree of contact (e.g., a pressure or a contact area) and output the detection result to the contact pattern recognition unit 102.

FIG. 2 is a view showing a state in which a finger that is a part of a user's body is in contact with a contact detection unit 101-*x* (one of the contact detection units 101-1 to 101-M) arranged on the surface of the information transfer device 100. FIG. 2 illustrates only one of the plurality of contact detection units 101-1 to 101-M. However, the human body need not always be in direct contact with the contact detection unit 101-*x*, as shown in FIG. 2.

Figure 4:
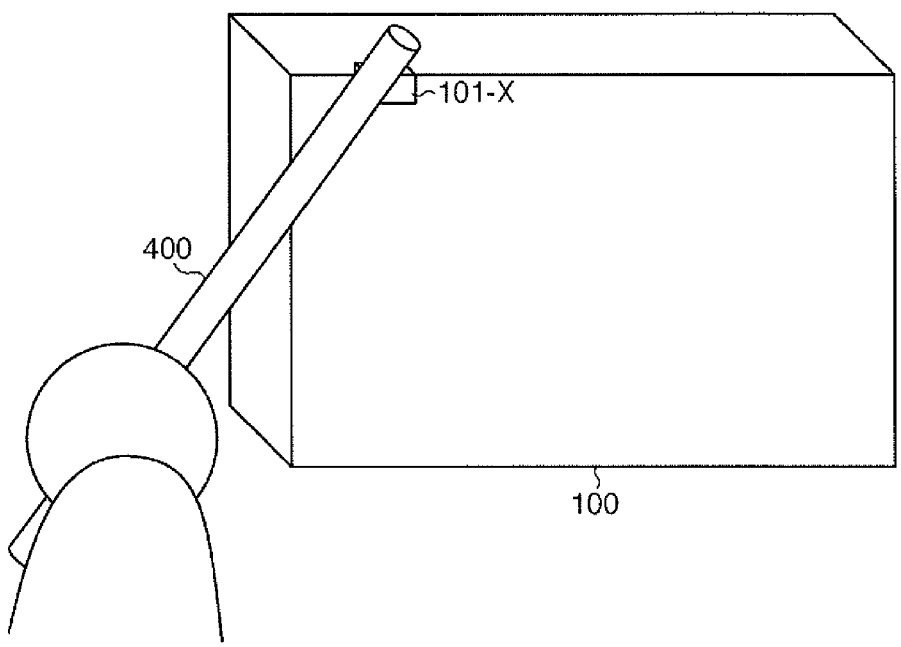
FIG. 4 is a view showing a state in which a pointing stick 400 held in a hand is in contact with the contact detection unit 101-x.

For example, even when a gloved hand 300 or a pointing stick 400 comes into contact with the contact detection unit 101-*x*, as shown in FIGS. 3 and 4, the contact detection unit 101-*x* may output a signal representing "presence of contact with the human body" to the contact pattern recognition unit 102.

Figure 5:
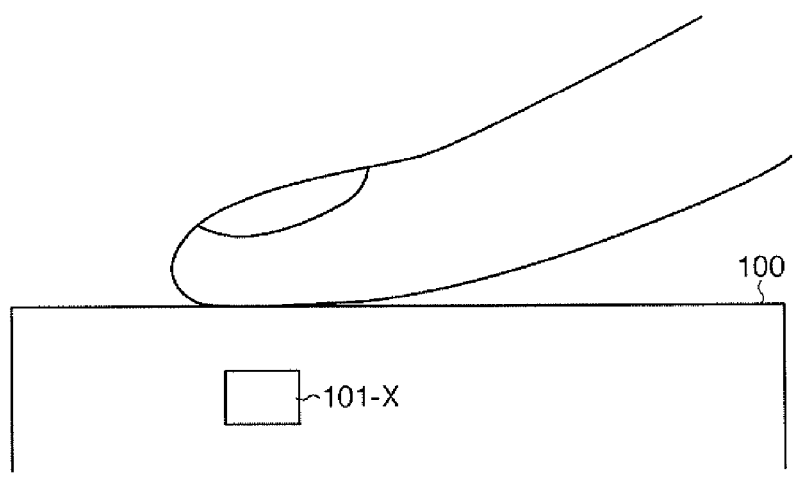
FIG. 5 is a view showing a state in which the human body is located within a predetermined range from the contact detection unit 101-x.

Even when the human body is located within a predetermined range from the contact detection unit 101-*x*, as shown in FIG. 5, the contact detection unit 101-*x* may output a signal representing "presence of contact with the human body" (presence of indirect contact with the user) to the contact pattern recognition unit 102.

For example, if the contact detection unit is formed from a capacitor sensor, its output value changes not only when the human body is in contact with the capacitor sensor but also when the human body is located near the capacitor sensor. Using, as a threshold, the value output from the capacitor when the human body is located within a predetermined range from the capacitor sensor, a situation in which the human body is located within a predetermined range from the capacitor sensor can be detected as "presence of contact with the human body". In the device that detects, as "presence of contact", the situation in which the human body is located within a predetermined range from the contact detection unit, when a body part comes into direct contact with one contact detection unit, another contact detection unit located within a predetermined range from it also detects the contact. In this case, direct contact and indirect contact are detected either as identical "contacts" or distinctively.

In this embodiment, any kind of sensor unit is usable as long as it can detect direct/indirect contact with a user or a physical object.

The contact pattern recognition unit 102 receives detection result signals periodically transmitted from the contact detection units 101-1 to 101-M and checks the level of each detection result signal. In this check, it is checked whether the level of each received detection result signal is equal to or higher than a threshold. As a result of the check, the contact pattern recognition unit 102 obtains a contact pattern which is information to specify (first specification) a contact detection unit that has output a detection result signal of level equal to or higher than the threshold (detection result signal representing presence of contact). In other words, the contact pattern represents a pattern of human body contact with the information transfer device 100. Note that a definition in broader sense such as a contact presence/absence distribution (the arrangement distribution of contact detection units that have detected contact) or a contact pressure distribution indicating the strength of contact in each space may be given as the contact pattern. Alternatively, the contact pattern may be "the shape and position/orientation of the human body in contact with the information transfer device 100", which is estimated from a spatial distribution concerning the contact.

Figure 6:
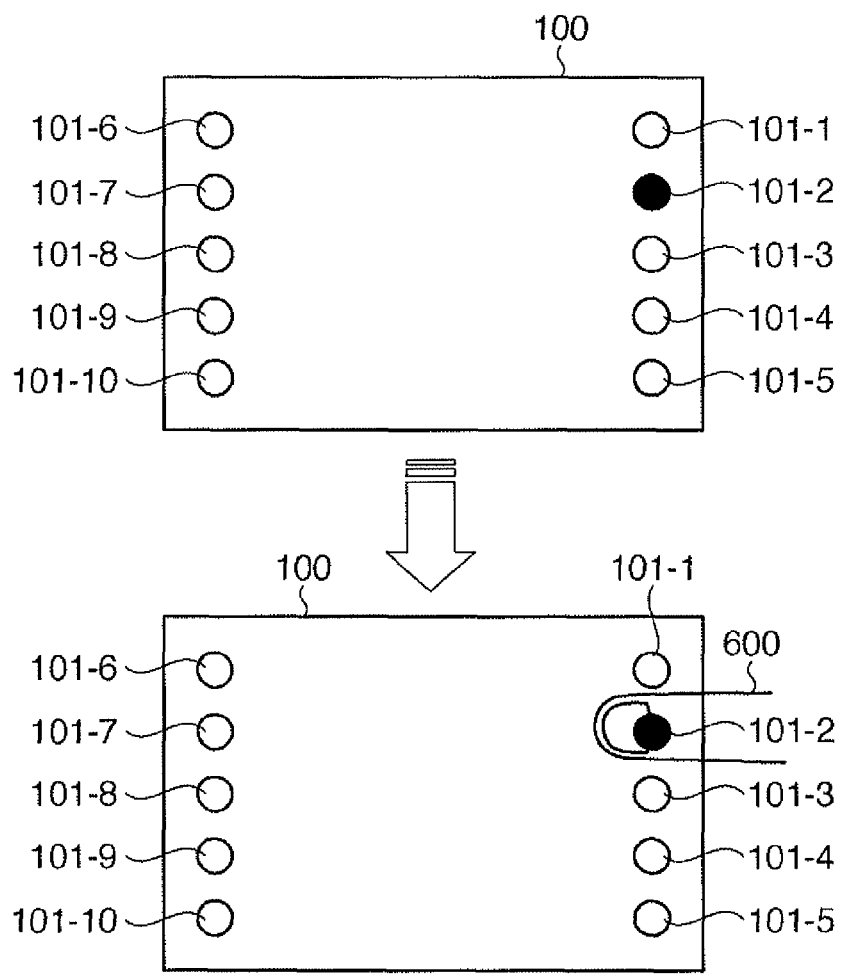
FIG. 6 is a view showing the information transfer device 100 having an array of contact detection units 101-6 to 101-10 vertically arranged along the left side of a surface of the information transfer device 100, and an array of contact detection units 101-1 to 101-5 vertically arranged along the right side.

An example of the operation of the contact pattern recognition unit 102 will be explained here with reference to FIG. 6. FIG. 6 is a view showing the information transfer device 100 having the array of contact detection units 101-6 to 101-10 vertically arranged along the left side of a surface of the information transfer device 100, and the array of contact detection units 101-1 to 101-5 vertically arranged along the right side. Each of the contact detection units 101-1 to 101-10 transmits a detection result signal representing presence/absence of contact to the contact pattern recognition unit 102, as described above. Assume that the contact pattern recognition unit 102 refers to each detection result signal and determines that only the contact detection unit 101-2 has output a detection result signal of level equal to or higher than the threshold. In this case, the contact pattern recognition unit 102 recognizes that a human body 600 (e.g., finger) is reached from the outside of the information transfer device 100 toward the contact detection unit 101-2. In this case, the contact pattern recognition unit 102 generates information (contact pattern) representing that only the contact detection unit 101-2 detects the contact.

Figure 7:
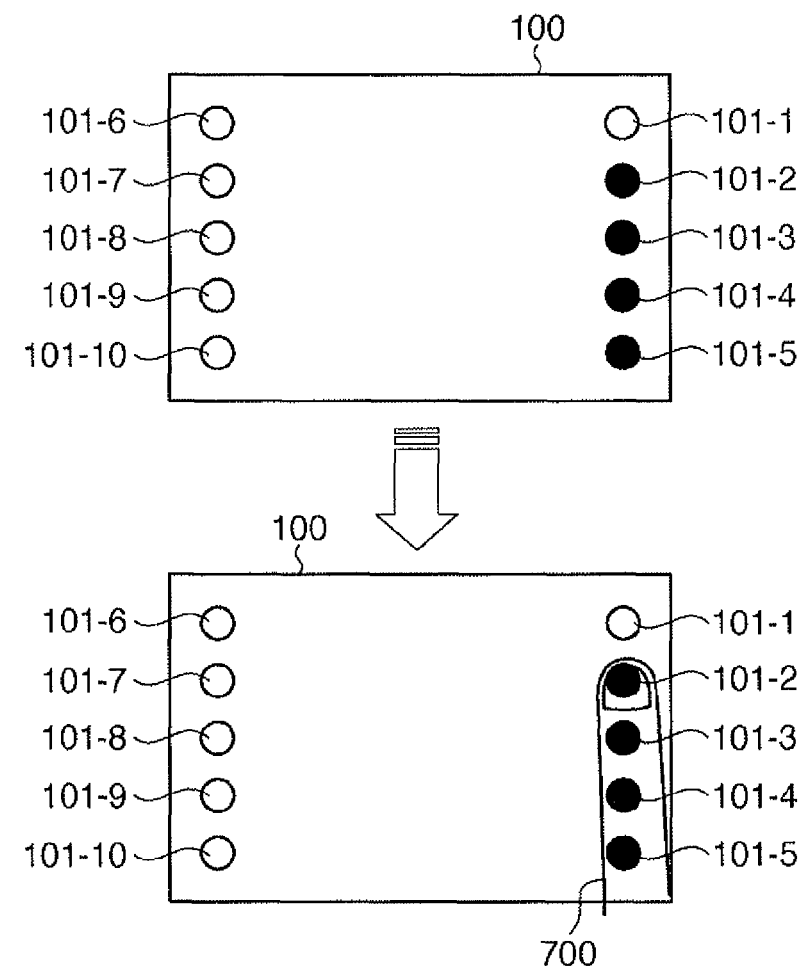
FIG. 7 is a view showing a state in which a contact pattern recognition unit 102 refers to each detection result signal and determines that the contact detection units 101-2 to 101-5 have output detection result signals of levels equal to or higher than a threshold.

Assume that the contact pattern recognition unit 102 refers to each detection result signal and determines that the contact detection units 101-2 to 101-5 have output detection result signals of levels equal to or higher than the threshold, as shown in FIG. 7. In this case, the contact pattern recognition unit 102 recognizes that a human body 700 (finger) is reached along the array of the contact detection units 101-2 to 101-5. In this case, the contact pattern recognition unit 102 generates information (contact pattern) representing that only the contact detection units 101-2 to 101-5 detect the contact.

In this way, the contact pattern recognition unit 102 outputs, to the stimulus pattern generation unit 103, the contact pattern which is information to specify a contact detection unit that has output a detection result signal of level equal to or higher than the threshold.

The stimulus pattern generation unit 103 receives the contact pattern output from the contact pattern recognition unit 102 and generates a stimulus pattern corresponding to the contact pattern. Based on the generated stimulus pattern, the stimulus pattern generation unit 103 outputs driving control signals to drive and control some or all of the stimulus presentation units 104-1 to 104-N to corresponding stimulus presentation units.

The stimulus pattern is a distribution of points that produce stimuli or a distribution indicating the intensity, quality, or time-rate change pattern of a stimulus in each space. "Information" to be presented to the user based on the stimulus pattern is, e.g., direction information such as "right" or status information such as "mail incoming". Stimulus pattern generation is determined based on the contact pattern received from the contact pattern recognition unit 102 and the type of information to be presented to the user.

More specifically, the stimulus pattern generation unit 103 specifies, based on the received contact pattern, contact detection units that have detected contact. Based on the arrangement distribution of the specified contact detection units, the stimulus pattern generation unit 103 specifies, out of the stimulus presentation units 104-1 to 104-N, a set of stimulus presentation units which should be in contact with the user's body (second specification). This specification processing is performed based on the positional relationship between the contact detection units 101-1 to 101-M and the stimulus presentation units 104-1 to 104-N. Assume that each contact detection unit and a stimulus presentation unit adjacent to it make a pair. In this case, a stimulus presentation unit paired with a contact detection unit that has detected contact is determined to be in contact with the human body. Next, to present information using the stimulus presentation unit determined to be in contact with the human body, the stimulus pattern generation unit 103 generates a stimulus pattern representing the operation rule of the stimulus presentation unit. For example, to notify the user of direction information "right", the stimulus pattern generation unit 103 generates a preset stimulus pattern to drive only the stimulus presentation units located relatively on the right side out of the stimulus presentation unit group determined to be in contact with the human body. Note that "contact with the human body" may also indicate that a stimulus presentation unit is not in direct contact with the human body but is located within a predetermined range from it. To determine whether a stimulus presentation unit is located "relatively on the right side", the stimulus pattern generation unit 103 may have an orientation sensor (not shown).

Based on the arrangement distribution of the contact detection units which have detected direct/indirect contact with the user and the type of information to be presented to the user, the stimulus pattern generation unit 103 thus specifies units to be driven out of the stimulus presentation units 104-1 to 104-N. Then, the stimulus pattern generation unit 103 generates a pattern to stimuli to be produced by the specified stimulus presentation units.

After stimulus pattern generation, the stimulus pattern generation unit 103 outputs a driving control signal based on the generated stimulus pattern to each driving target stimulus presentation unit. The driving control signal can designate either only ON/OFF of driving or the intensity or time-rate change of a stimulus to be presented by driving.

The stimulus presentation units 104-1 to 104-N are arranged on or inside the information transfer device 100 in a predetermined arrangement pattern. Each of the stimulus presentation units 104-1 to 104-N receives a driving control signal from the stimulus pattern generation unit 103 and operates (produces a stimulus) based on the received driving control signal. In this case, the stimulus is a tactile stimulus which is perceived when the human body is in direct contact with the stimulus presentation unit or in contact with the vicinity of it, or has entered a predetermined range via clothes or the like (when the human body is in indirect contact with the stimulus presentation unit). Each of the stimulus presentation units 104-1 to 104-N is formed from, e.g., an oscillator, a voice coil, or a small pin array. If the driving control signal designates only ON/OFF of driving, the stimulus presentation unit that has received the driving control signal is driven to produce a stimulus having a predetermined intensity. If the driving control signal also designates a stimulus intensity, the stimulus presentation unit is driven to produce a stimulus at that intensity. If the driving control signal also designates a time-rate change, the stimulus presentation unit is driven to produce a stimulus that changes as designated.

<Operation of Information Transfer Device 100>

Figure 8:
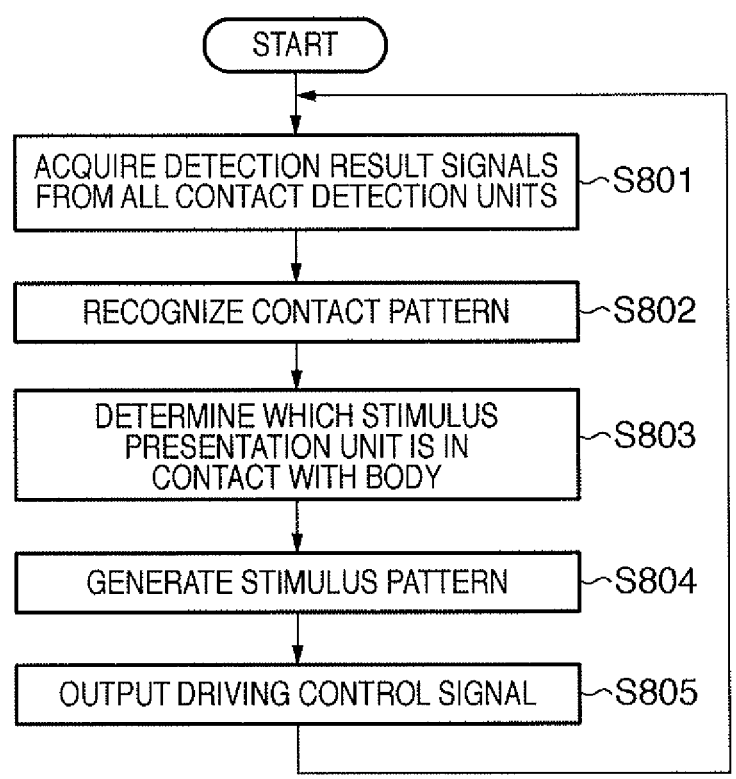
FIG. 8 is a flowchart of processing executed by the information transfer device 100.

FIG. 8 is a flowchart of processing executed by the information transfer device 100.

First, in step S801, the contact pattern recognition unit 102 acquires a detection result signal transmitted from each of the contact detection units 101-1 to 101-M and representing presence/absence of contact or a contact strength.

In step S802, based on the detection result signal group acquired in step S801, the contact pattern recognition unit 102 recognizes the human body contact pattern on the information transfer device 100. The contact pattern recognition unit 102 outputs, to the stimulus pattern generation unit 103, data representing the thus recognized contact pattern.

In step S803, based on the contact pattern output from the contact pattern recognition unit 102, the stimulus pattern generation unit 103 specifies, out of the stimulus presentation units 104-1 to 104-N, a set of stimulus presentation units which should be in contact with the user's body.

In step S804, the stimulus pattern generation unit 103 generates a stimulus pattern to specify, out of the stimulus presentation units contained in the set specified in step S803, stimulus presentation units to be used to present notification information.

In step S805, the stimulus pattern generation unit 103 outputs a corresponding driving control signal to each stimulus presentation unit specified by the generated stimulus pattern. Each of the stimulus presentation units 104-1 to 104-N operates (produces a stimulus) based on the driving control signal received from the stimulus pattern generation unit 103.

The process then returns to step S801 to repeat the subsequent processes.

With the above-described processing, the information transfer device 100 recognizes the user's way of gripping the information transfer device 100 and, based on the recognition result, causes a portion that is reliably in contact with the user to produce a stimulus. This makes it possible to correctly present, to the user, information to be presented.

<Modification>

Figure 9:
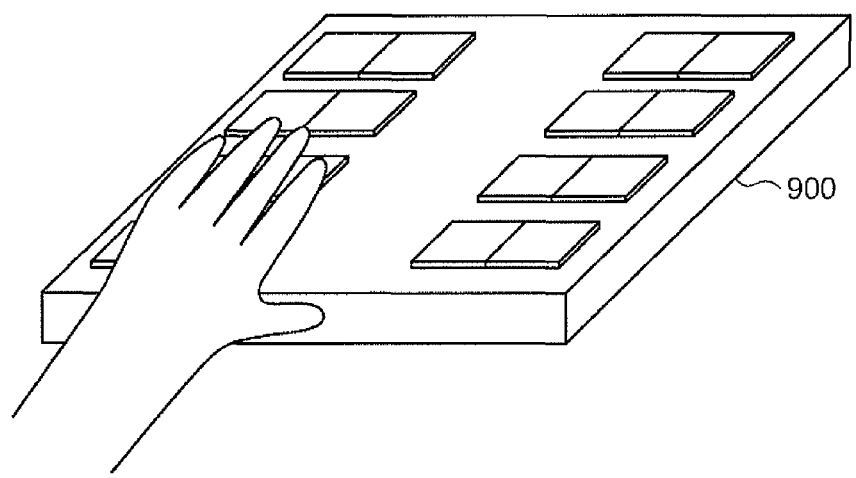
FIG. 9 is a view showing an example of the outer appearance of a stationary device 900 which is installed on a floor or a table and can be operated by a user who touches its surface.

In the above description, the information transfer device 100 is gripped by the user. However, the first embodiment is not always limited to the gripped type. For example, a stationary device 900 installed on a floor or a table can be operated by a user who touches its surface, as shown in FIG. 9, may be used as the information transfer device 100.

Second Embodiment

Arrangement of Information Transfer Device 1000

Figure 10:
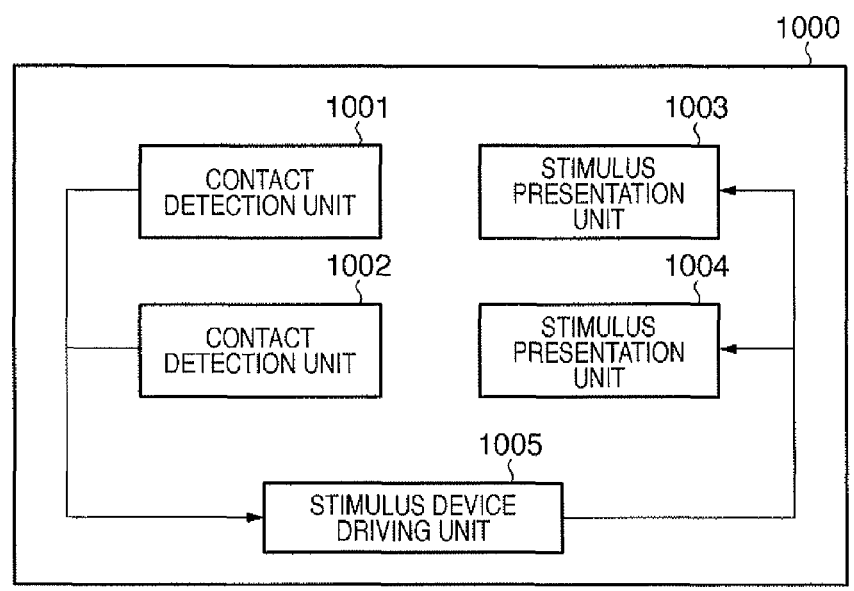
FIG. 10 is a block diagram showing an example of the functional arrangement of an information transfer device 1000.

FIG. 10 is a block diagram showing an example of the functional arrangement of the information transfer device 1000. As shown in FIG. 10, the information transfer device 1000 includes contact detection units 1001 and 1002, stimulus presentation units 1003 and 1004, and a stimulus device driving unit 1005.

The contact detection units 1001 and 1002 perform the same operation as that of the contact detection units 101-1 to 101-M and are arranged on or inside the information transfer device 1000 in a predetermined arrangement pattern. Each of the contact detection units 1001 and 1002 (first and second contact detection units) outputs a signal representing a detection result to the stimulus device driving unit 1005.

The stimulus presentation unit 1003 is the same as each of the stimulus presentation units 104-1 to 104-N described in the first embodiment. The stimulus presentation unit 1003 is arranged on or inside the information transfer device 1000 and, more particularly, near the contact detection unit 1001. The stimulus presentation unit 1004 is the same as each of the stimulus presentation units 104-1 to 104-N described in the first embodiment. The stimulus presentation unit 1004 is arranged on or inside the information transfer device 1000 and, more particularly, near the contact detection unit 1002. Each of the stimulus presentation units 1003 and 1004 (first and second stimulus presentation units) receives a driving control signal from the stimulus device driving unit 1005 and operates (produces a stimulus) based on the received driving control signal. In this case, the stimulus is a tactile stimulus which is perceived when the human body is in direct contact with the stimulus presentation unit or in contact with the vicinity of it, or has entered a predetermined range via clothes or the like (when the human body is in indirect contact with the stimulus presentation unit).

Figure 11:
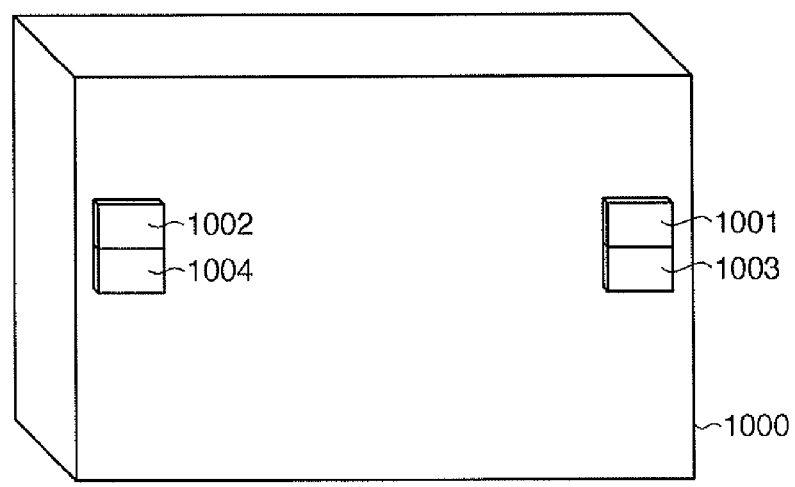
FIG. 11 is a view showing an example of the outer appearance of the information transfer device 1000.

FIG. 11 is a view showing an example of the outer appearance of the information transfer device 1000. As shown in FIG. 11, the contact detection units 1001 and 1002 and the stimulus presentation units 1003 and 1004 are arranged on a surface of the information transfer device 1000. The contact detection unit 1001 and the stimulus presentation unit 1003 are arranged adjacent on the right side of the surface. The contact detection unit 1002 and the stimulus presentation unit 1004 are arranged adjacent on the left side of the surface.

In accordance with detection result signals received from the contact detection units 1001 and 1002, the stimulus device driving unit 1005 generates stimulus patterns to drive and control the stimulus presentation units 1003 and 1004. More specifically, the stimulus device driving unit 1005 refers to a signal received from the contact detection unit 1001. If the signal represents presence of direct/indirect contact with a human body or a physical object, the stimulus device driving unit 1005 outputs a driving control signal representing a first driving pattern to the stimulus presentation unit 1003. Similarly, the stimulus device driving unit 1005 refers to a signal received from the contact detection unit 1002. If the signal represents presence of direct/indirect contact with a human body or a physical object, the stimulus device driving unit 1005 outputs a driving control signal representing a second driving pattern to the stimulus presentation unit 1004. Each driving pattern expresses transfer information by combining stimuli produced based on it.

Figure 12:
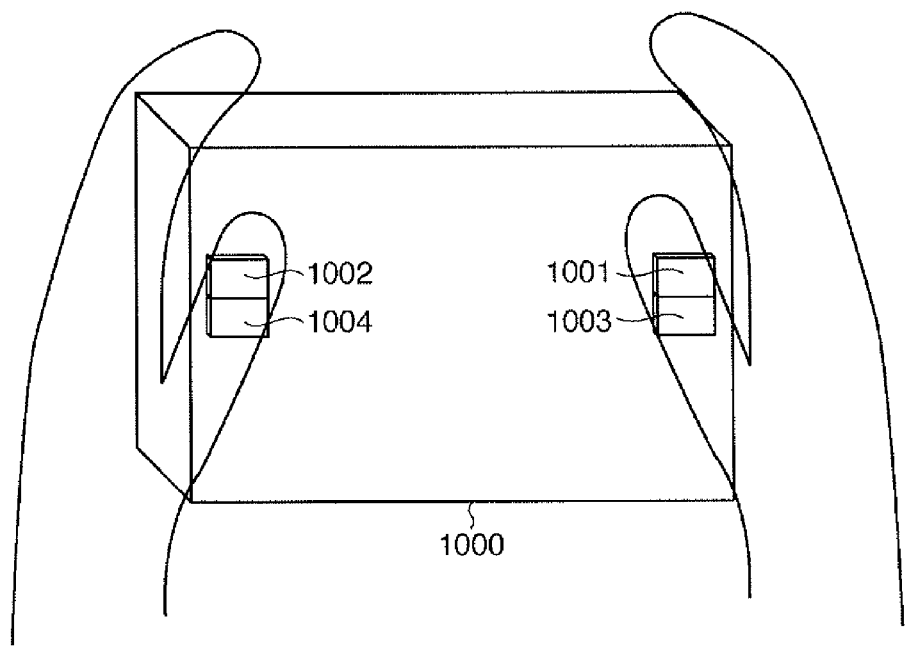
FIG. 12 is a view showing a state in which the user's right hand grips the right side of the information transfer device 1000, and the left hand grips the left side.
Figure 13:
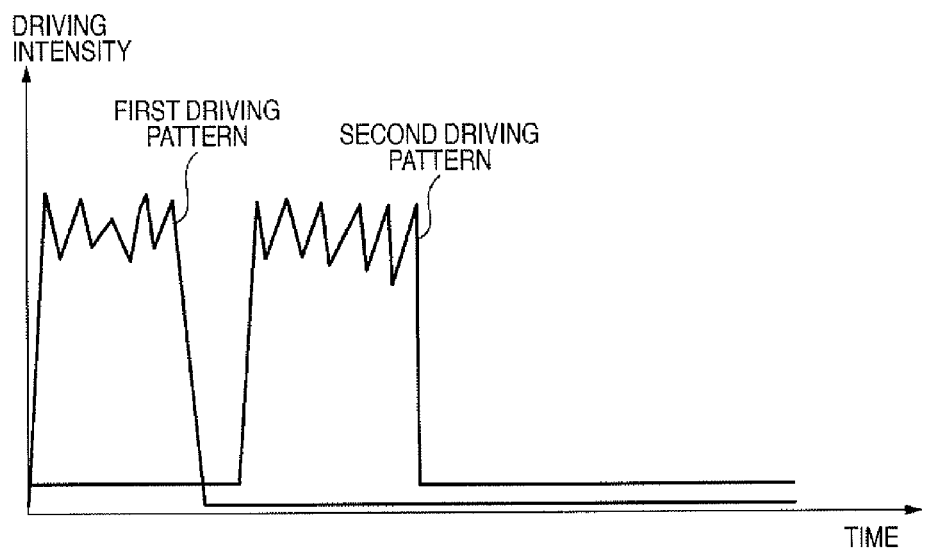
FIG. 13 is a view showing an example of the waveforms of a first driving pattern and a second driving pattern

The operation of the information transfer device 1000 when transferring direction information "from the right to the left" to the user will be explained. The essence of the following description is almost the same even for transfer information of other type. Assume that the user's right hand grips the right side of the information transfer device 1000, and the left hand grips the left side, as shown in FIG. 12. The stimulus device driving unit 1005 receives signals representing presence of contact from both the contact detection units 1001 and 1002. At this time, the stimulus device driving unit 1005 outputs signals having waveforms shown in FIG. 13 to the stimulus presentation units 1003 and 1004 as the driving control signal representing the first driving pattern and that representing the second driving pattern, respectively. Referring to FIG. 13, time is plotted along the abscissa, and the driving intensity (stimulus intensity) is plotted along the ordinate.

The stimulus presentation unit 1003 is driven first, and the stimulus presentation unit 1004 is driven next. Since the contact detection unit 1001 detects the contact with the right hand, the stimulus presentation unit 1003 arranged near the contact detection unit 1001 is also supposed to be in contact with the right hand. Hence, the stimulus presentation unit 1003 which is driven first presents a stimulus to the right hand. Similarly, since the contact detection unit 1002 detects the contact with the left hand, the stimulus presentation unit 1004 arranged near the contact detection unit 1002 is also supposed to be in contact with the left hand. Hence, the stimulus presentation unit 1004 which is driven subsequently presents a stimulus to the left hand.

In this way, the stimulus is presented first to the right hand and then to the left hand after a predetermined time lag. The information transfer device 1000 thus transfers the direction information "from the right to the left" to the user.

Assume that the stimulus device driving unit 1005 receives a signal representing presence of contact from the contact detection unit 1001 and a signal representing absence of contact from the contact detection unit 1002. In this case, the stimulus device driving unit 1005 outputs a driving control signal representing a third driving pattern to the stimulus presentation unit 1003. The third driving pattern expresses predetermined information via a stimulus produced upon driving. The predetermined information is information fixed in advance or information received from an external information processing unit (not shown).

Figure 14:
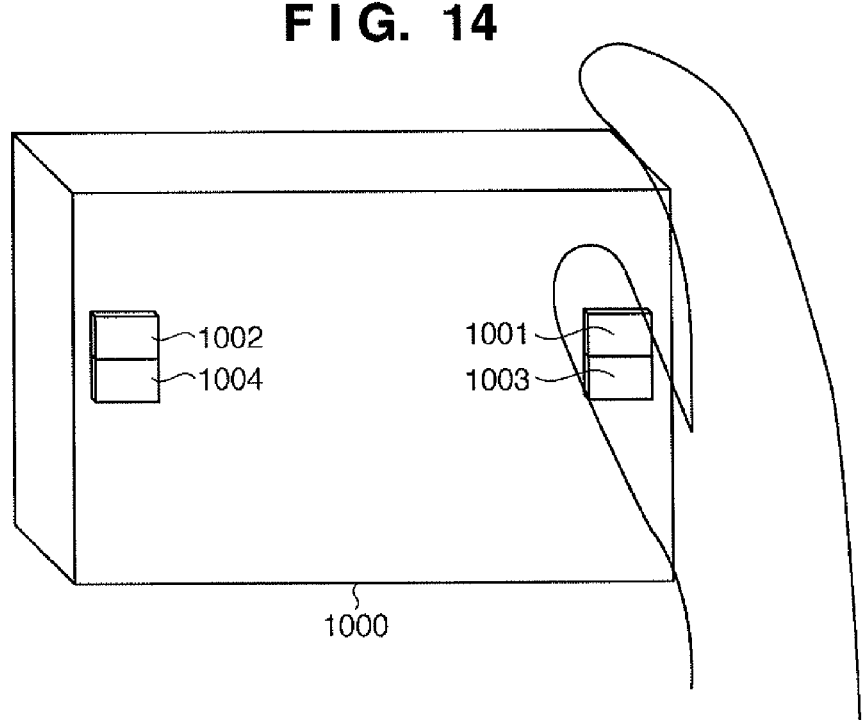
FIG. 14 is a view showing a state in which the user's right hand grips the right side of the information transfer device 1000.
Figure 15:
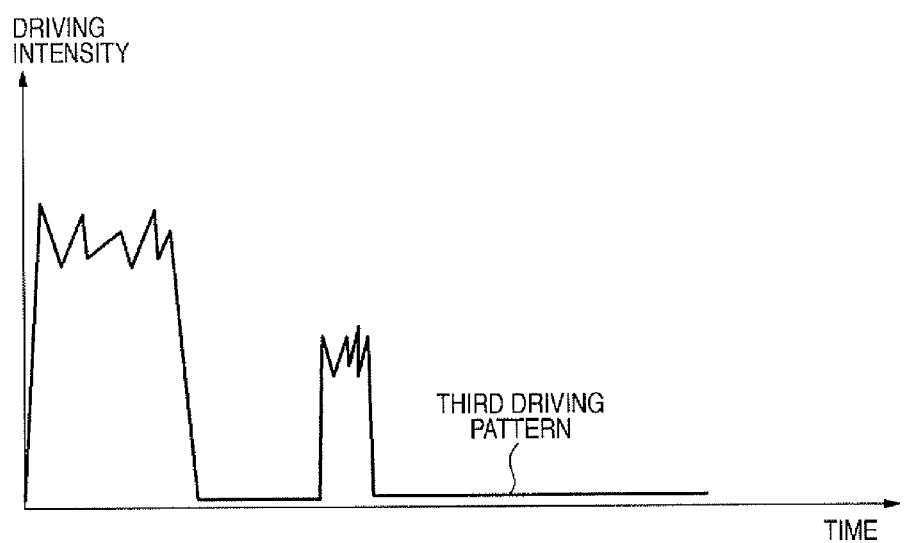
FIG. 15 is a view showing an example of the waveform of a third driving pattern.

A case in which direction information "from the right to the left" is transferred to the user will be explained again. Assume that the user's right hand grips the right side of the information transfer device 1000, as shown in FIG. 14. The stimulus device driving unit 1005 receives a signal representing presence of contact from the contact detection unit 1001 and a signal representing absence of contact from the contact detection unit 1002. At this time, the stimulus device driving unit 1005 outputs a signal having a waveform shown in FIG. 15 to the stimulus presentation unit 1003 as the driving control signal representing the third driving pattern. Referring to FIG. 15, time is plotted along the abscissa, and the driving intensity (stimulus intensity) is plotted along the ordinate.

The stimulus presentation unit 1003 is driven first long and then short. Since the contact detection unit 1001 detects the contact with the right hand, the stimulus presentation unit 1003 arranged near the contact detection unit 1001 is also supposed to be in contact with the right hand. Hence, the stimulus presentation unit 1003 is driven to present a stimulus to the right hand. The first long driving of the stimulus presentation unit 1003 presents a temporally long stimulus to the right hand. Subsequently, the short driving of the stimulus presentation unit 1003 presents a temporally short stimulus to the right hand. The information transfer device 1000 thus transfers the direction information "from the right to the left" to the user.

Note that to transfer direction information "from the left to the right" to the user, the stimulus device driving unit 1005 outputs, to the stimulus presentation unit 1003, a driving control signal representing a pattern opposite to the third pattern shown in FIG. 15. The first short driving of the stimulus presentation unit 1003 presents a temporally short stimulus to the right hand. Next, the long driving of the stimulus presentation unit 1003 presents a temporally long stimulus to the right hand. The information transfer device 1000 thus transfers the direction information "from the left to the right" to the user.

The user can know in advance or afterward the combination of the transfer information and the stimulus pattern to express it. It can be notified the user of a direction to be presented and a corresponding stimulus pattern in advance. The combination of the transfer information and the stimulus pattern to express it is not limited to the above-described example. The combination may be held by the stimulus device driving unit 1005 in advance as a table. Alternatively, every time transfer information is known, the stimulus device driving unit 1005 may produce a stimulus.

Note that in the example shown in FIG. 14, since the contact detection unit 1002 outputs no signal representing "presence of contact", the stimulus presentation unit 1004 is also supposed to have no contact. At this time, it is impossible to make the user tactilely perceive a stimulus representing transfer information by driving the stimulus presentation unit 1004. The stimulus device driving unit 1005 may instead output a driving control signal representing "driving OFF" to the stimulus presentation unit 1004 simultaneously with outputting the driving control signal representing the third driving pattern to the stimulus presentation unit 1003.

In this case, since the stimulus presentation unit 1004 is not driven, power consumed by the information transfer device 1000 can be saved. However, the stimulus device driving unit 1005 may output the driving control signal representing the third driving pattern to the stimulus presentation unit 1003 and simultaneously the driving control signal representing the third driving pattern to the stimulus presentation unit 1004 as well. Driving of the stimulus presentation unit 1004 can give a stimulus to the user not perceptually but visually (for example, the user can visually confirm the vibration). Hence, the stimulus presentation unit 1004 can be driven to visually assist perception of the tactile stimulus produced by the stimulus presentation unit 1003.

Assume that the stimulus device driving unit 1005 receives a signal representing absence of contact from the contact detection unit 1001 and a signal representing presence of contact from the contact detection unit 1002. At this time, the stimulus device driving unit 1005 outputs the driving control signal representing the third driving pattern to the stimulus presentation unit 1004. For example, to transfer direction information "from the right to the left" to the user, the stimulus device driving unit 1005 drives the stimulus presentation unit 1004 first short and then long. Since the contact detection unit 1002 detects the contact with the left hand, the stimulus presentation unit 1004 arranged near the contact detection unit 1002 is also supposed to be in contact with the left hand. Hence, the stimulus presentation unit 1004 is driven to present a stimulus to the left hand. The first short driving of the stimulus presentation unit 1004 presents a temporally short stimulus to the left hand. Subsequently, the long driving of the stimulus presentation unit 1004 presents a temporally long stimulus to the left hand. The information transfer device 1000 thus transfers the direction information "from the right to the left" to the user. Reversely, to transfer direction information "from the left to the right" to the user, the stimulus device driving unit 1005 drives the stimulus presentation unit 1004 first long and then short. The first long driving of the stimulus presentation unit 1004 presents a temporally long stimulus to the left hand. Next, the short driving of the stimulus presentation unit 1004 presents a temporally short stimulus to the left hand. The information transfer device 1000 thus transfers the direction information "from the left to the right" to the user.

<Operation of Information Transfer Device 1000>

Figure 16:
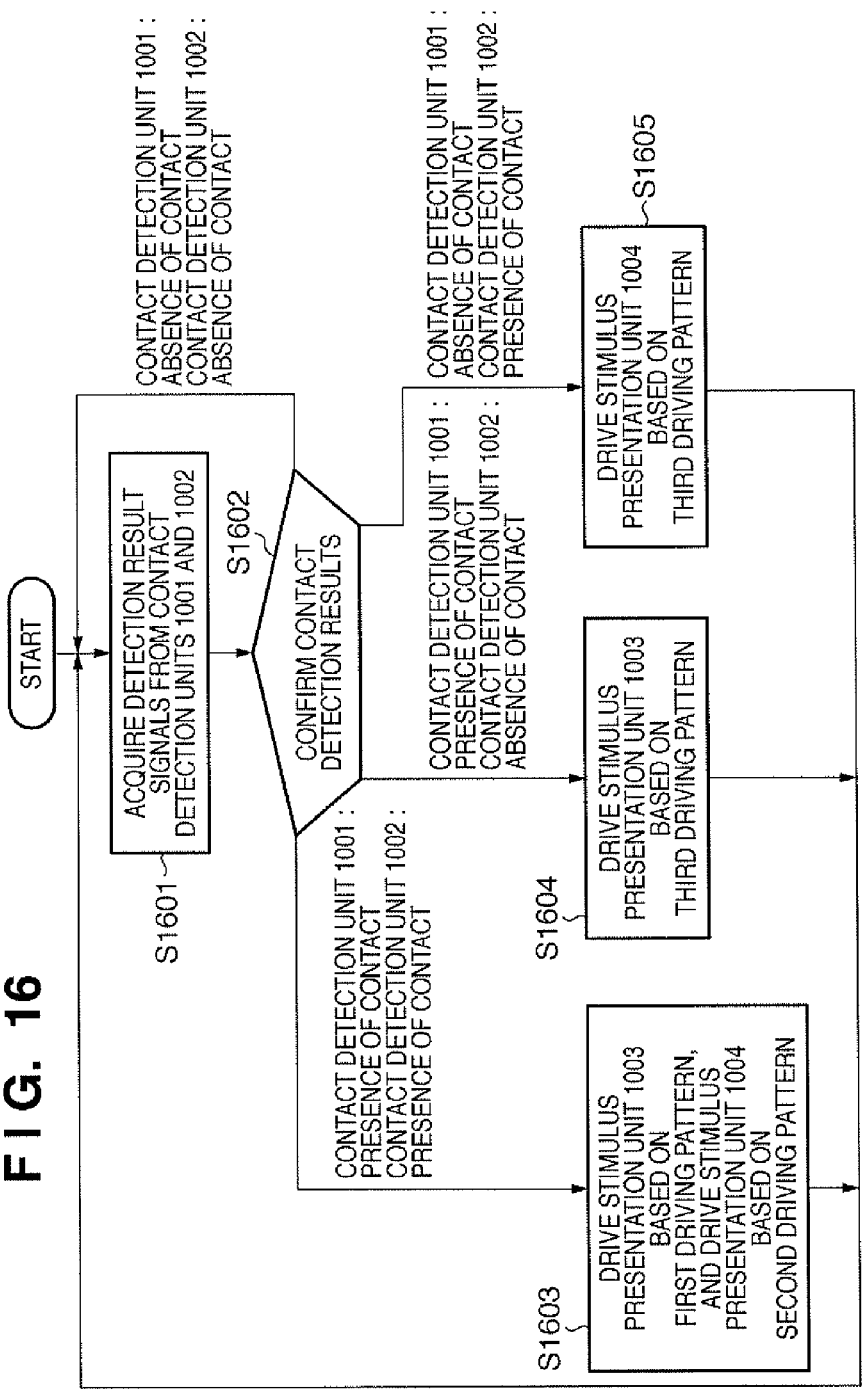
FIG. 16 is a flowchart of processing executed by the information transfer device 1000.

FIG. 16 is a flowchart of processing executed by the information transfer device 1000.

First, in step S1601, the stimulus device driving unit 1005 acquires a detection result signal transmitted from each of the contact detection units 1001 and 1002 and representing presence/absence of contact or a contact strength.

In step S1602, the stimulus device driving unit 1005 refers to each detection result signal acquired in step S1601. The stimulus device driving unit 1005 determines whether each detection result signal represents presence of contact or absence of contact. This determination is the same as in the first embodiment.

The processing branches based on the determination result.

When the stimulus device driving unit 1005 receives signals representing presence of contact from both the contact detection units 1001 and 1002, the process advances to step S1603. When the stimulus device driving unit 1005 receives a signal representing presence of contact from the contact detection unit 1001 and a signal representing absence of contact from the contact detection unit 1002, the process advances to step S1604. When the stimulus device driving unit 1005 receives a signal representing absence of contact from the contact detection unit 1001 and a signal representing presence of contact from the contact detection unit 1002, the process advances to step S1605. When the stimulus device driving unit 1005 receives signals representing absence of contact from both the contact detection units 1001 and 1002, the process returns to step S1601.

In step S1603, the stimulus device driving unit 1005 outputs signals having the waveforms shown in FIG. 13 to the stimulus presentation units 1003 and 1004 as the driving control signal representing the first driving pattern and that representing the second driving pattern, respectively. The stimulus presentation units 1003 and 1004 are driven based on the received driving control signals, respectively. The process then returns to step S1601.

In step S1604, the stimulus device driving unit 1005 outputs the driving control signal representing the third driving pattern to the stimulus presentation unit 1003. The stimulus presentation unit 1003 is driven based on the received driving control signal. The process then returns to step S1601.

In step S1605, the stimulus device driving unit 1005 outputs the driving control signal representing the third driving pattern to the stimulus presentation unit 1004. The stimulus presentation unit 1004 is driven based on the received driving control signal. The process then returns to step S1601. Note that the third driving pattern in step S1605 is different from that in step S1604, as described above. However, the transfer information expressed by the third driving pattern in step S1605 is the same as that expressed by the third driving pattern in step S1604.

By repeating the above-described processing, the information transfer device 1000 can recognize the contact state of the user on it and notify the user of transfer information via a tactile stimulus in accordance with the contact state.

Third Embodiment

An information transfer device according to this embodiment transfers information to a user via a tactile stimulus, as in the second embodiment. In the information transfer device of this embodiment, each of the stimulus presentation units 1003 and 1004 described in the second embodiment further includes a plurality of stimulus presentation units (sub-stimulus presentation units). That is, including a plurality of stimulus presentation units into, e.g., the stimulus presentation unit 1003 enables finer (more correct) information presentation.

<Arrangement of Information Transfer Device 1700>

Figure 17:
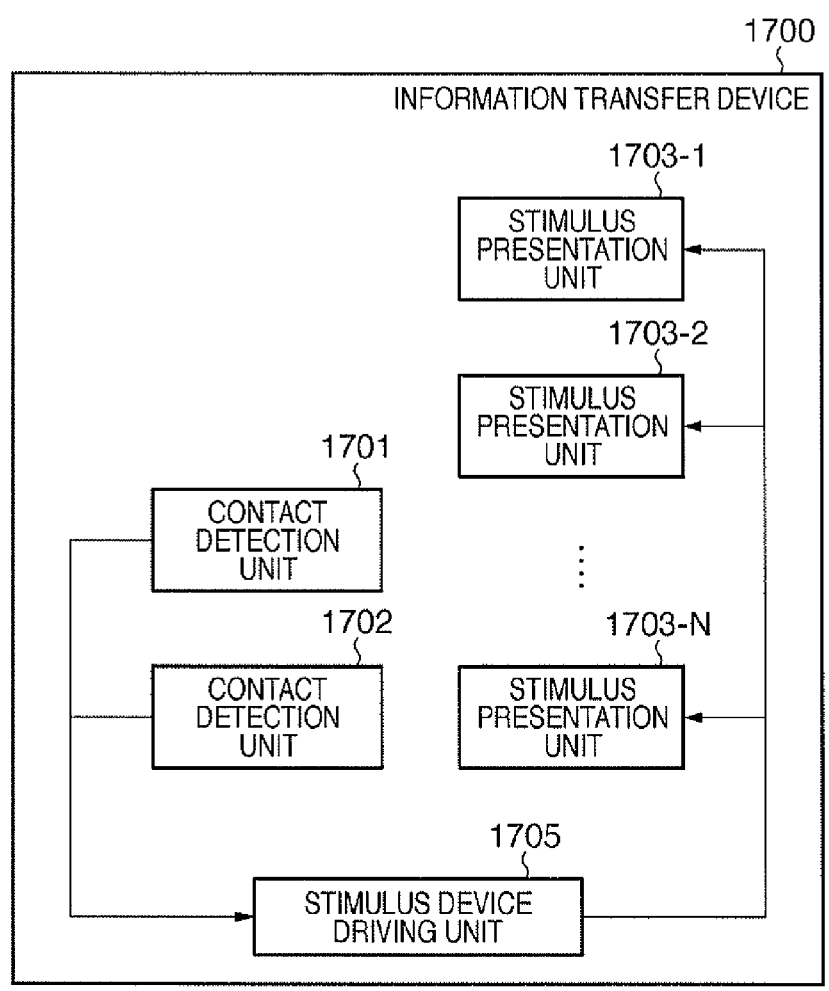
FIG. 17 is a block diagram showing an example of the functional arrangement of an information transfer device 1700 according to the third embodiment of the present invention.

FIG. 17 is a block diagram showing an example of the functional arrangement of the information transfer device 1700 according to this embodiment. As shown in FIG. 17, the information transfer device 1700 includes contact detection units 1701 and 1702, stimulus presentation units 1703-1 to 1703-N, and a stimulus device driving unit 1705.

The contact detection units 1701 and 1702 are the same as the contact detection units 1001 and 1002 described in the second embodiment and are arranged on or inside the information transfer device 1700 in a predetermined arrangement pattern. Each of the contact detection units 1701 and 1702 outputs a signal representing a detection result to the stimulus device driving unit 1705.

Each of the stimulus presentation units 1703-1 to 1703-N is arranged on or inside the information transfer device 1700. Each of the stimulus presentation units 1703-1 to 1703-M (2<M<N) is the same as the stimulus presentation unit 1003 described in the second embodiment and is arranged near the contact detection unit 1701. Each of the stimulus presentation units 1703-(M+1) to 1703-N is the same as the stimulus presentation unit 1004 described in the second embodiment and is arranged near the contact detection unit 1702. That is, the stimulus presentation units 1703-1 to 1703-N are divided into two groups, i.e., the group of the stimulus presentation units 1703-1 to 1703-M and the group of the stimulus presentation units 1703-(M+1) to 1703-N. The number of divided groups need not always be two depending on the number of contact detection units or the arrangement form of the stimulus presentation units.

Figure 18:
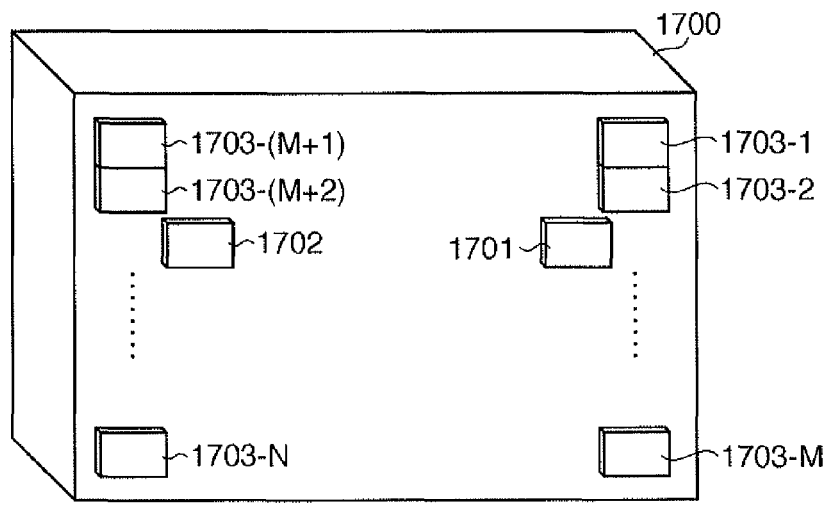
FIG. 18 is a view showing an example of the outer appearance of the information transfer device 1700.

FIG. 18 is a view showing an example of the outer appearance of the information transfer device 1700. As shown in FIG. 18, the array of the stimulus presentation units 1703-(M+1) to 1703-N is vertically arranged along the left side of a surface of the information transfer device 1700. The contact detection unit 1702 is arranged near them. On the other hand, the array of the stimulus presentation units 1703-1 to 1703-M is vertically arranged along the right side of the surface of the information transfer device 1700. The contact detection unit 1701 is arranged near them.

Based on detection result signals received from the contact detection units 1701 and 1702, the stimulus device driving unit 1705 supplies a driving pattern to each of the stimulus presentation units 1703-1 to 1703-N. The driving pattern represents the ON/OFF pattern of driving or the time-rate change pattern of intensity.

Figure 19:
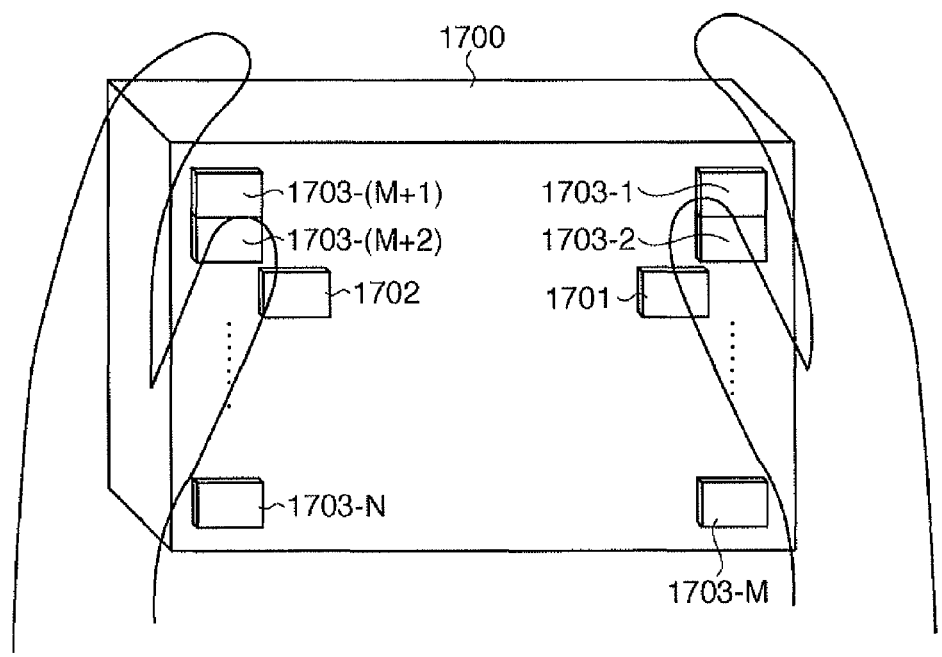
FIG. 19 is a view showing a state in which the user's right hand grips the right side of the information transfer device 1700, and the left hand grips the left side.

Assume that the user's right hand grips the right side of the information transfer device 1700, and the left hand grips the left side, as shown in FIG. 19. The stimulus device driving unit 1705 receives detection result signals representing presence of contact from both the contact detection units 1701 and 1702. In this case, the user can be supposed to hold the entire information transfer device 1700 by both hands. Hence, the stimulus device driving unit 1705 estimates that the tip of the user's right thumb is in contact with one of the stimulus presentation units 1703-1 to 1703-M. The stimulus device driving unit 1705 also estimates that the tip of the user's left thumb is in contact with one of the stimulus presentation units 1703-(M+1) to 1703-N. That is, the stimulus device driving unit 1705 estimates the contact state between the human body and a larger number of stimulus presentation units based on the contact detection results from the contact detection units fewer than the stimulus presentation units. The stimulus device driving unit 1705 outputs driving control signals representing a first driving pattern to the stimulus presentation units 1703-1 to 1703-M and driving control signals representing a second driving pattern to the stimulus presentation units 1703-(M+1) to 1703-N.

Each driving pattern expresses transfer information by combining stimuli produced upon driving. Since the plurality of stimulus presentation units present identical stimuli, the user perceives a tactile stimulus expressing transfer information if one of them is in contact with his/her body.

Figure 20:
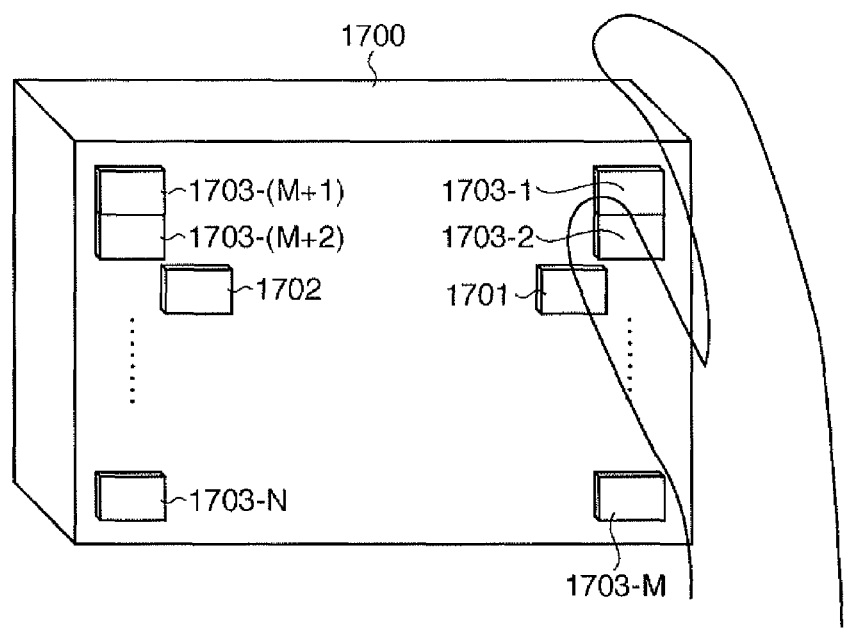
FIG. 20 is a view showing a state in which the user's right hand grips the right side of the information transfer device 1700.

Assume that the user's right hand grips the right side of the information transfer device 1700, as shown in FIG. 20. The stimulus device driving unit 1705 receives a detection result signal representing presence of contact from the contact detection unit 1701 and a detection result signal representing absence of contact from the contact detection unit 1702. In this case, the user can be supposed to hold the entire information transfer device 1700 by only the right hand. Hence, the stimulus device driving unit 1705 estimates that the user's right thumb from its tip to the base is in contact with one of the stimulus presentation units 1703-1 to 1703-M.

For transfer information "downward from the upper side", the stimulus device driving unit 1705 outputs, to the stimulus presentation units 1703-1 to 1703-M, driving control signals representing a driving pattern to cause the stimulus presentation units 1703-1 to 1703-M to sequentially produce stimuli. If the supposition is correct, the user's thumb is stimulated from its tip to the base sequentially from the upper side, thereby notifying the user of the transfer information "downward from the upper side". For transfer information "from the right to the left", the stimulus device driving unit 1705 outputs driving control signals representing a stimulus pattern to cause the stimulus presentation units 1703-1 to 1703-M to simultaneously produce stimuli first long and then short. If the supposition is correct, the whole user's right thumb perceives tactile stimuli first long and then short and thus receives the transfer information "from the right to the left".

As described in these examples, providing a plurality of stimulus presentation units to create a situation where more stimulus presentation units come into contact with the body brings about an advantage in increasing the types of information expression methods corresponding to the ways of contact.

The relationship between the contact detection results of the contact detection units 1701 and 1702, the transfer information, and the driving patterns of the stimulus presentation units 1703-1 to 1703-N is not limited to the above-described examples. The relationship may be held by the stimulus device driving unit 1705 in advance as a table. Alternatively, every time a contact detection result is obtained, the stimulus device driving unit 1705 may estimate the contact state between the user and the plurality of stimulus presentation units and generate, based on the estimation result, a driving pattern corresponding to transfer information.

<Operation of Information Transfer Device 1700>

Figure 21:
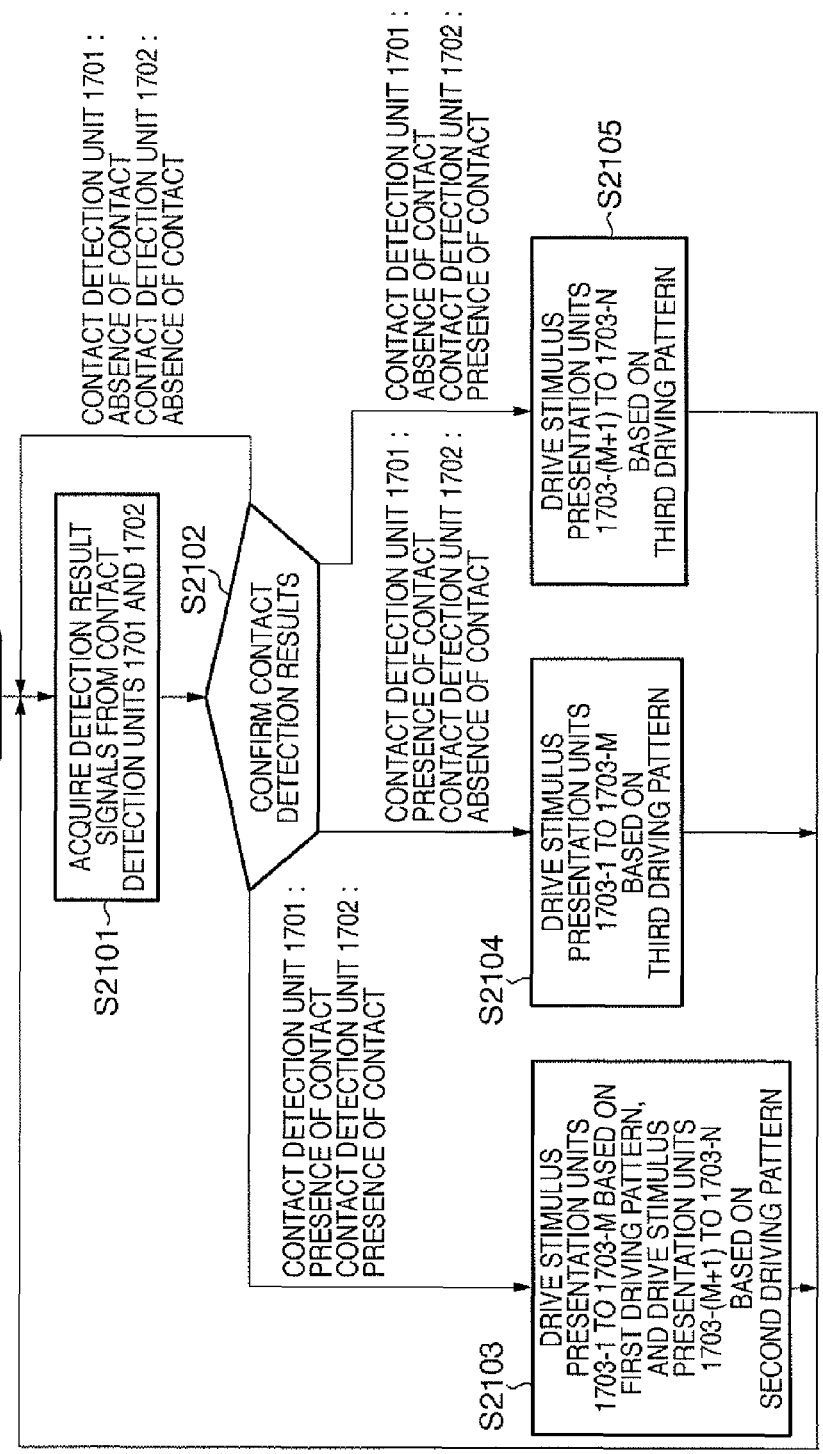
FIG. 21 is a flowchart of processing executed by the information transfer device 1700.

FIG. 21 is a flowchart of processing executed by the information transfer device 1700.

First, in step S2101, the stimulus device driving unit 1705 acquires a detection result signal transmitted from each of the contact detection units 1701 and 1702 and representing presence/absence of contact or a contact strength.

In step S2102, the stimulus device driving unit 1705 refers to each detection result signal acquired in step S2101. The stimulus device driving unit 1705 determines whether each detection result signal represents presence of contact or absence of contact. This determination is the same as in the first embodiment.

The processing branches based on the determination result.

When the stimulus device driving unit 1705 receives signals representing presence of contact from both the contact detection units 1701 and 1702, the process advances to step S2103. When the stimulus device driving unit 1705 receives a signal representing presence of contact from the contact detection unit 1701 and a signal representing absence of contact from the contact detection unit 1702, the process advances to step S2104. When the stimulus device driving unit 1705 receives a signal representing absence of contact from the contact detection unit 1701 and a signal representing presence of contact from the contact detection unit 1702, the process advances to step S2105. When the stimulus device driving unit 1705 receives signals representing absence of contact from both the contact detection units 1701 and 1702, the process returns to step S2101.

In step S2103, the stimulus device driving unit 1705 outputs the driving control signal representing the first driving pattern to the stimulus presentation units 1703-1 to 1703-M and the driving control signal representing the second driving pattern to the stimulus presentation units 1703-(M+1) to 1703-N. The first driving pattern and the second driving pattern can be either predetermined or generated in this step in accordance with the human body contact state on the stimulus presentation units 1703-1 to 1703-N estimated from the contact detection results received from the contact detection units 1701 and 1702. The stimulus presentation units 1703-1 to 1703-N are driven based on the received driving control signals (driving patterns), respectively, thereby producing tactile stimuli which combine to express transfer information. The process then returns to step S2101.

In step S2104, the stimulus device driving unit 1705 outputs the driving control signal representing the third driving pattern to the stimulus presentation units 1703-1 to 1703-M. The third driving pattern can be either predetermined or generated in this step in accordance with the human body contact state on the stimulus presentation units 1703-1 to 1703-M estimated from the contact detection results received from the contact detection units 1701 and 1702. The stimulus presentation units 1703-1 to 1703-M are driven based on the received driving control signal (driving pattern), thereby producing tactile stimuli which combine to express transfer information. The process then returns to step S2101.

In step S2105, the stimulus device driving unit 1705 outputs the driving control signal representing the third driving pattern to the stimulus presentation units 1703-(M+1) to 1703-N. The third driving pattern can be either predetermined or generated in this step in accordance with the human body contact state on the stimulus presentation units 1703-(M+1) to 1703-N estimated from the contact detection results received from the contact detection units 1701 and 1702. The stimulus presentation units 1703-(M+1) to 1703-N are driven based on the received driving control signal (driving pattern), thereby producing tactile stimuli which combine to express transfer information. The process then returns to step S2101.

By repeating the above-described processing, the information transfer device 1700 can notify the user of transfer information via a tactile stimulus regardless of the user's way of holding the information transfer device.

Fourth Embodiment

An information transfer device according to this embodiment transfers information to a user via a tactile stimulus, as in the second embodiment. In the information transfer device of this embodiment, each of the contact detection units 1001 and 1002 described in the second embodiment further includes a plurality of contact detection units (sub-contact detection units). That is, including a plurality of contact detection units into, e.g., the contact detection unit 1001 enables finer (more correct) contact detection.

<Arrangement of Information Transfer Device 2200>

FIG. 22 is a block diagram showing an example of the functional arrangement of the information transfer device 2200 according to this embodiment. As shown in FIG. 22, the information transfer device 2200 includes contact detection units 2201-1 to 2201-N, stimulus presentation units 2203 and 2204, and a stimulus device driving unit 2205.

Each of the contact detection units 2201-1 to 2201-M is the same as the contact detection unit 1001 described in the second embodiment and is arranged on or inside the information transfer device 2200 in a predetermined arrangement pattern. Each of the contact detection units 2201-(M+1) to 2201-N is the same as the contact detection unit 1002 described in the second embodiment and is arranged on or inside the information transfer device 2200 in a predetermined arrangement pattern. Each of the contact detection units 2201-1 to 2201-N outputs a signal representing a detection result to the stimulus device driving unit 2205.

The stimulus presentation units 2203 and 2204 are the same as the stimulus presentation units 1003 and 1004 of the second embodiment.

Figure 23:
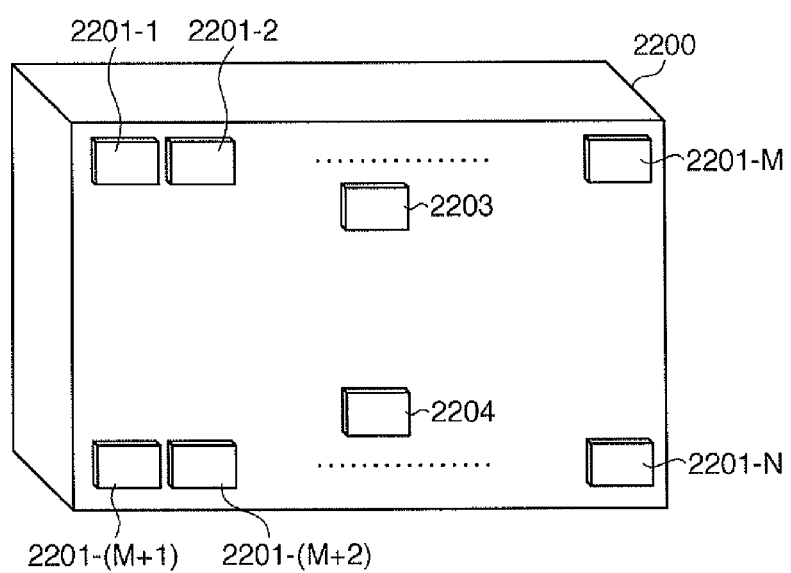
FIG. 23 is a view showing an example of the outer appearance of the information transfer device 2200.

FIG. 23 is a view showing an example of the outer appearance of the information transfer device 2200. As shown in FIG. 23, the array of the contact detection units 2201-1 to 2201-M is horizontally arranged along the upper side of a surface of the information transfer device 2200. The stimulus presentation unit 2203 is arranged near them. On the other hand, the array of the contact detection units 2201-(M+1) to 2201-N is horizontally arranged along the lower side of the surface of the information transfer device 2200. The stimulus presentation unit 2204 is arranged near them. That is, the contact detection units 2201-1 to 2201-N are divided into two groups, i.e., the group of the contact detection units 2201-1 to 2201-M and the group of the contact detection units 2201-(M+1) to 2201-N. The number of divided groups need not always be two depending on the number of stimulus presentation units or the arrangement form of the contact detection units.

Based on detection result signals received from the contact detection units 2201-1 to 2201-N, the stimulus device driving unit 2205 supplies a driving pattern to each of the stimulus presentation units 2203 and 2204. The driving pattern represents ON/OFF of driving or a time-rate change of intensity.

The stimulus device driving unit 2205 refers to the detection result signals received from the contact detection units 2201-1 to 2201-N. If following <condition 1> is satisfied as a result of the reference, the stimulus device driving unit 2205 supplies a first driving pattern to the stimulus presentation unit 2203 and a second driving pattern to the stimulus presentation unit 2204.

<Condition 1>

The stimulus device driving unit 2205 receives detection result signals representing presence of contact from a predetermined number or more of contact detection units out of the contact detection units 2201-1 to 2201-M and detection result signals representing presence of contact from a predetermined number or more of contact detection units out of the contact detection units 2201-(M+1) to 2201-N.

Each driving pattern expresses transfer information by combining stimuli produced upon driving.

The first driving pattern and the second driving pattern can either be constant independently of the number (effective number) of contact detection units which have output detection result signals of levels equal to or higher than a threshold or change in accordance with the effective number. For example, the first driving pattern or the second driving pattern may be a pattern having an amplitude proportional to the effective number. Alternatively, the first driving pattern and the second driving pattern may be decided based on the combination of the contact detection units which have output detection result signals of levels equal to or higher than the threshold. For example, when a contact detection unit closer to the stimulus presentation unit 2203 or 2204 outputs a detection result signal of level equal to or higher than the threshold, a driving pattern with a high intensity may be used as the first driving pattern and the second driving pattern. For example, if the contact detection unit which has output a detection result signal of level equal to or higher than the threshold is registered in advance as a contact detection unit of interest, it is possible to determine that the user is gripping the information transfer device 2200 as supposed (or well). In this case, a driving pattern capable of notifying the user of transfer information in more detail may be used as the first driving pattern and the second driving pattern. If the contact detection unit which has output a detection result signal of level equal to or higher than the threshold is not that registered in advance as a contact detection unit of interest, it is possible to determine that the user is gripping the information transfer device 2200 in a manner against the supposition (or poorly). In this case, a driving pattern capable of reliably notifying the user of at least an outline of transfer information may be used as the first driving pattern and the second driving pattern.

If following <condition 2> is satisfied, the stimulus device driving unit 2205 supplies a third driving pattern to the stimulus presentation unit 2203.

<Condition 2>

The stimulus device driving unit 2205 receives detection result signals representing presence of contact from a predetermined number or more of contact detection units out of the contact detection units 2201-1 to 2201-M and detection result signals representing absence of contact from a predetermined number or more of contact detection units out of the contact detection units 2201-(M+1) to 2201-N.

The third driving pattern expresses transfer information via a stimulus produced upon driving. The third driving pattern can either be constant independently of the number (effective number) of contact detection units which have output detection result signals of levels equal to or higher than a threshold or change in accordance with the effective number. For example, the third driving pattern may be a pattern having an amplitude proportional to the effective number. Alternatively, the third driving pattern may be decided based on the combination of the contact detection units which have output detection result signals of levels equal to or higher than the threshold. For example, when a contact detection unit closer to the stimulus presentation unit 2203 outputs a detection result signal of level equal to or higher than the threshold, a driving pattern with a high intensity may be used as the third driving pattern.

As described above, providing contact detection units more than the stimulus presentation units to detect a more detailed contact state makes it possible to notify the user of transfer information via a stimulus corresponding to the contact state detected in more detail.

<Operation of Information Transfer Device 2200>

Figure 24:
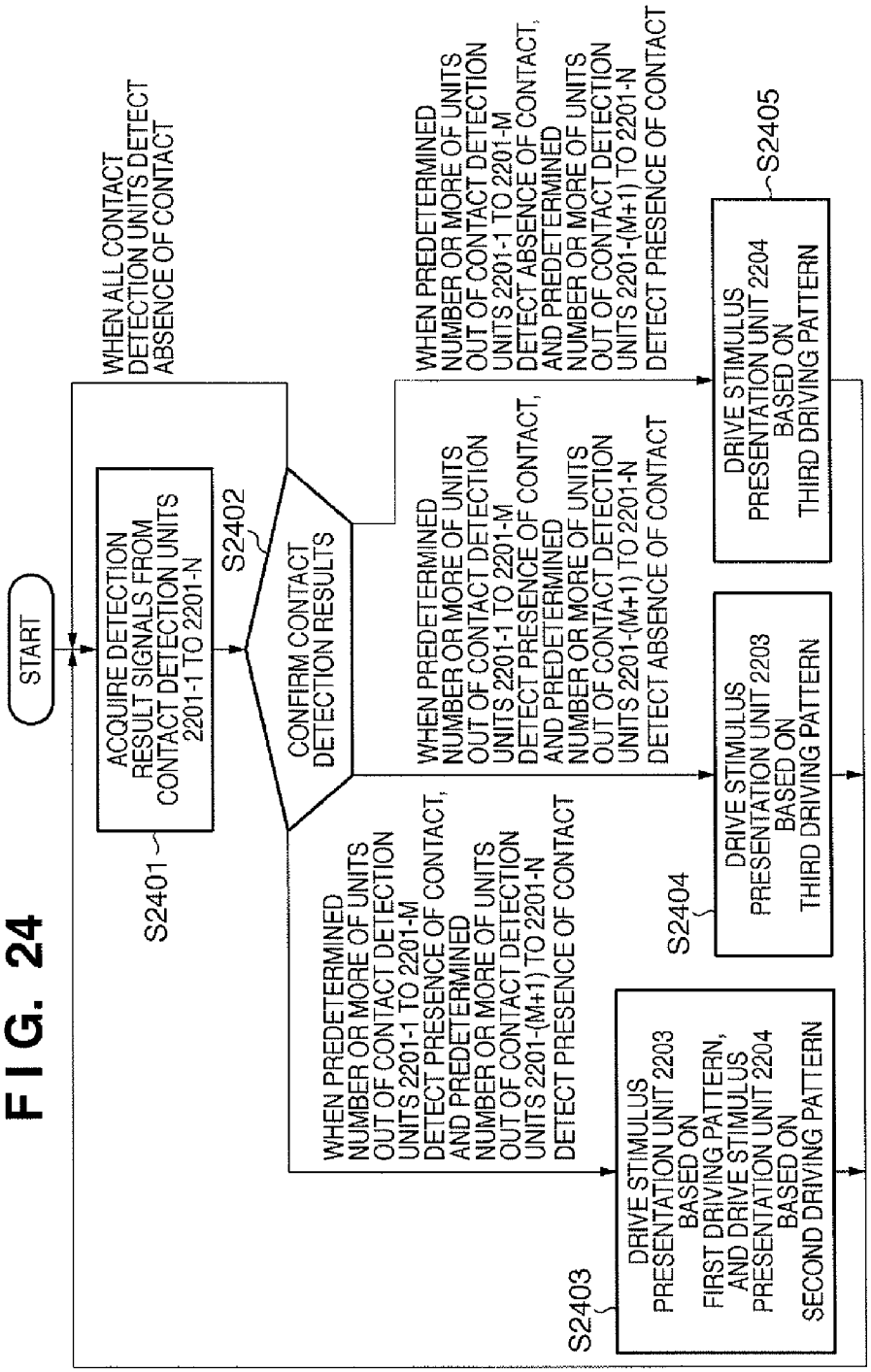
FIG. 24 is a flowchart of processing executed by the information transfer device 2200.

FIG. 24 is a flowchart of processing executed by the information transfer device 2200.

First, in step S2401, the stimulus device driving unit 2205 acquires a detection result signal transmitted from each of the contact detection units 2201-1 to 2201-N and representing presence/absence of contact or a contact strength.

In step S2402, the stimulus device driving unit 2205 refers to each detection result signal acquired in step S2401. The stimulus device driving unit 2205 determines whether each detection result signal represents presence of contact or absence of contact. This determination is the same as in the first embodiment.

The processing branches based on the determination result.

When the stimulus device driving unit 2205 detects that condition 1 is satisfied, the process advances to step S2403. When the stimulus device driving unit 2205 detects that condition 2 is satisfied, the process advances to step S2404. When the stimulus device driving unit 2205 detects that following condition 3 is satisfied, the process advances to step S2405.

<Condition 3>

The stimulus device driving unit 2205 receives detection result signals representing absence of contact from a predetermined number or more of contact detection units out of the contact detection units 2201-1 to 2201-M and detection result signals representing presence of contact from a predetermined number or more of contact detection units out of the contact detection units 2201-(M+1) to 2201-N.

When the stimulus device driving unit 2205 detects that following condition 4 is satisfied, the process returns to step S2401.

<Condition 4>

The stimulus device driving unit 2205 receives detection result signals representing absence of contact from a predetermined number or more of contact detection units out of the contact detection units 2201-1 to 2201-M and detection result signals representing absence of contact from a predetermined number or more of contact detection units out of the contact detection units 2201-(M+1) to 2201-N.

In step S2403, the stimulus device driving unit 2205 outputs the driving control signal representing the first driving pattern to the stimulus presentation units 2203 and the driving control signal representing the second driving pattern to the stimulus presentation unit 2204. The first driving pattern and the second driving pattern can be either predetermined or generated in this step in accordance with the human body contact state on the stimulus presentation units 2203 and 2204 estimated from the contact detection results received from the contact detection units 2201-1 to 2201-N. The stimulus presentation units 2203 and 2204 are driven based on the received driving control signals (driving patterns), respectively, thereby producing tactile stimuli which combine to express transfer information. The process then returns to step S2401.

In step S2404, the stimulus device driving unit 2205 outputs the driving control signal representing the third driving pattern to the stimulus presentation unit 2203. The stimulus presentation unit 2203 is driven based on the received driving control signal (driving pattern), thereby producing a tactile stimulus to express transfer information. The process then returns to step S2401.

In step S2405, the stimulus device driving unit 2205 outputs the driving control signal representing the third driving pattern to the stimulus presentation unit 2204. The stimulus presentation unit 2204 is driven based on the received driving control signal (driving pattern), thereby producing a tactile stimulus to express transfer information. The process then returns to step S2401.

By repeating the above-described processing, the information transfer device 2200 notifies the user of transfer information via a tactile stimulus regardless of the user's way of holding the information transfer device.

Fifth Embodiment

An information transfer device according to this embodiment transfers information not only via a perceptual stimulus as in the above-described embodiments but also via another stimulus. Information transfer via a visual stimulus or an auditory stimulus assists information transfer via a tactile stimulus. The information transfer device according to this embodiment will be described below.

<Arrangement of Information Transfer Device 2500>

Figure 25:
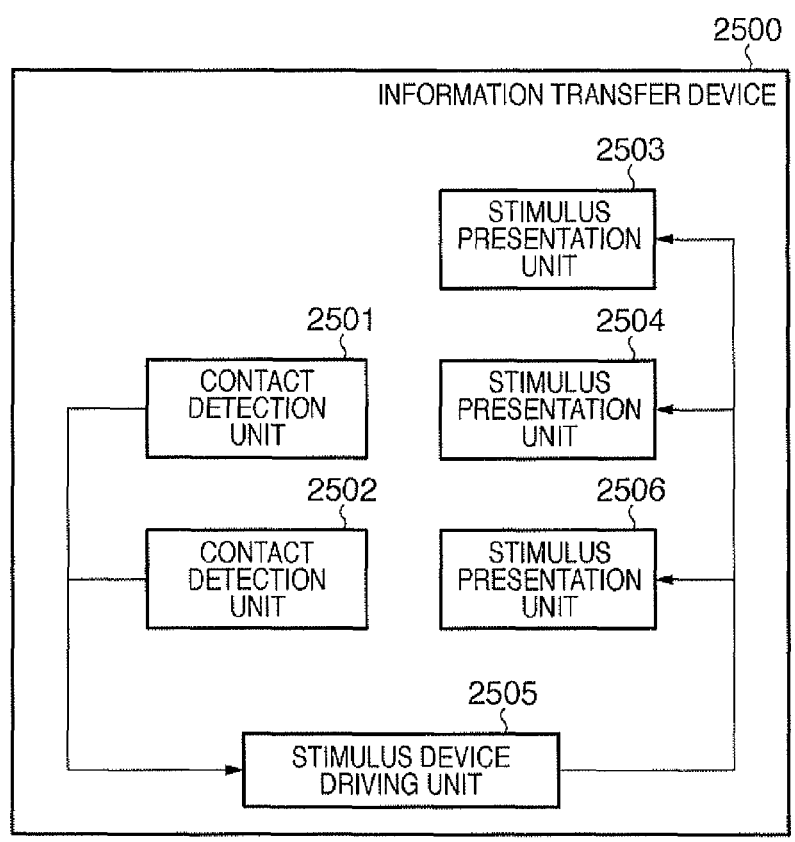
FIG. 25 is a block diagram showing an example of the functional arrangement of an information transfer device 2500.

FIG. 25 is a block diagram showing an example of the functional arrangement of the information transfer device 2500. As shown in FIG. 25, the information transfer device 2500 includes contact detection units 2501 and 2502, stimulus presentation units 2503, 2504, and 2506, and a stimulus device driving unit 2505.

The contact detection units 2501 and 2502 are the same as the contact detection units 1001 and 1002 of the second embodiment.

The stimulus presentation units 2503 and 2504 are the same as the stimulus presentation units 1003 and 1004 of the second embodiment.

The stimulus presentation unit 2506 (third stimulus presentation unit) is arranged on or inside the information transfer device 2500. The stimulus presentation unit 2506 is driven in accordance with a driving pattern generated by the stimulus device driving unit 2505 to present a stimulus to a user. The stimulus presentation unit 2506 produces a stimulus other than a tactile stimulus. Examples are a visual stimulus and an auditory stimulus. The user perceives a visual stimulus when he/she views the stimulus presentation unit. The stimulus presentation unit 2506 is formed from an LED, a light, a display, a speaker, or the like. The driving pattern for a visual stimulus is an image pattern. That for an auditory stimulus is a voice pattern.

The operation of the stimulus device driving unit 2505 is basically the same as that of the stimulus device driving unit 1005 of the second embodiment. However, the stimulus device driving unit 2505 of the fifth embodiment supplies a driving pattern to the stimulus presentation unit 2506 as well based on detection result signals received from the contact detection units 2501 and 2502, unlike the stimulus device driving unit 1005.

Expecting that information transfer via stimuli presented by the stimulus presentation units 2503 and 2504 will be insufficient, the information transfer device 2500 having the stimulus presentation unit 2506 can assist the information transfer using a stimulus other than a tactile stimulus. Assume that the stimulus device driving unit 2505 receives a detection result signal representing presence of contact from the contact detection unit 2501 and a detection result signal representing absence of contact from the contact detection unit 2502. In this case, the stimulus device driving unit 2505 outputs a driving control signal representing a third driving pattern to the stimulus presentation unit 2503. The third driving pattern expresses transfer information via a stimulus produced upon driving.

At this time, the stimulus device driving unit 2505 expects that the stimulus produced by only the stimulus presentation unit 2503 is unable to completely transfer information, and outputs a driving control signal representing a fourth driving pattern to the stimulus presentation unit 2506. The fourth driving pattern expresses transfer information via a stimulus other than a tactile stimulus produced upon driving. The pattern can be either the same as the third driving pattern or different from it. For example, the stimulus presentation unit 2506 which presents a visual stimulus emits light at the same timing as the tactile stimulus presentation by the stimulus presentation unit 2503. Alternatively, the stimulus presentation unit 2506 which presents an auditory stimulus generates sound at the same timing as the tactile stimulus presentation by the stimulus presentation unit 2503. The stimulus presented by the stimulus presentation unit 2506 allows the user to receive the stimuli expressing transfer information via a plurality of senses. It is therefore expected that the information can more reliably be transferred to the user.

As another example, the stimulus presentation unit 2506 which presents a visual stimulus may explicitly show transfer information by a text or an image. The stimulus presentation unit 2506 which presents an auditory stimulus may explicitly express transfer information by a voice. In this case, the user can associate a tactile stimulus with transfer information expressed by it. It is therefore expected that the user can more easily interpret a stimulus in subsequent information transfer.

<Operation of Information Transfer Device 2500>

Figure 26:
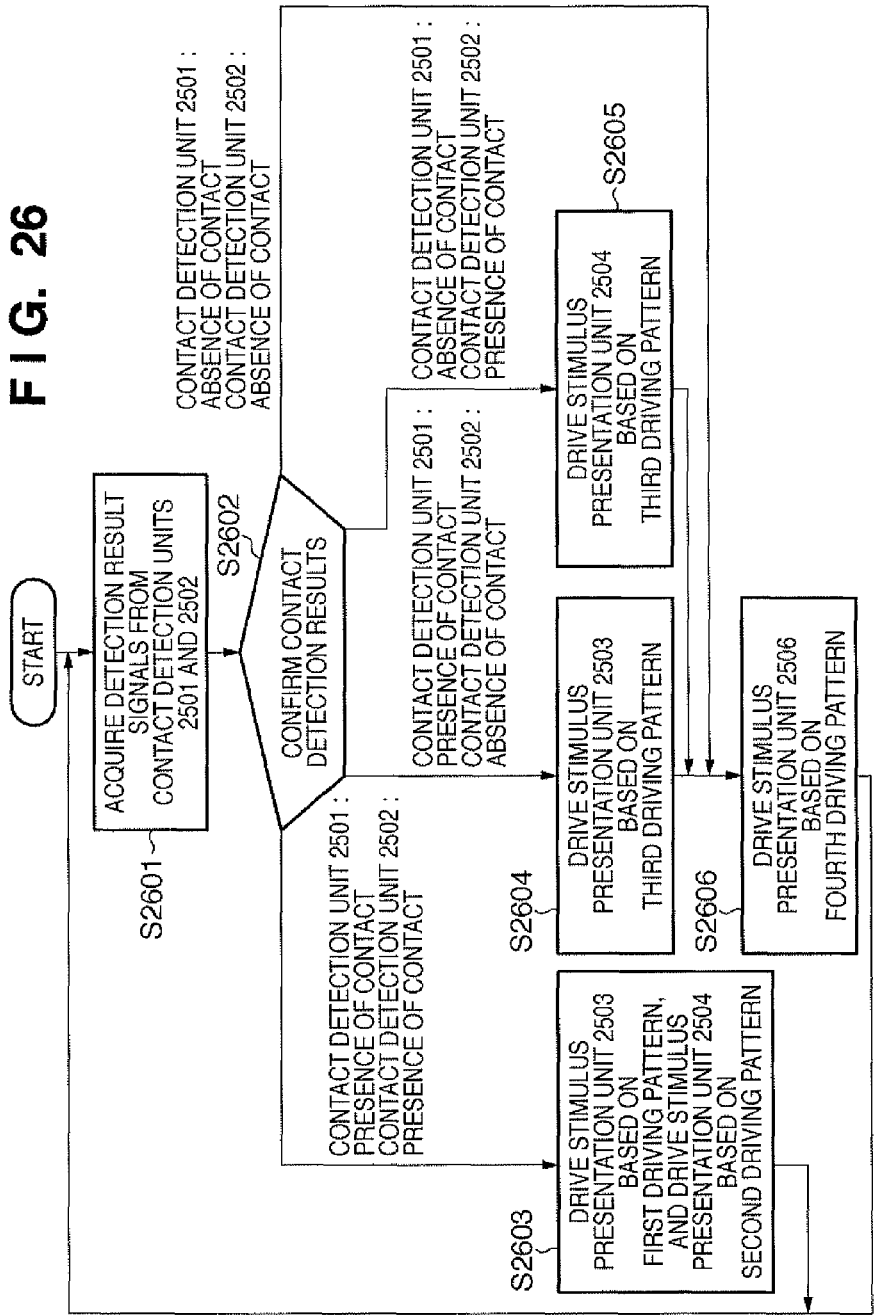
FIG. 26 is a flowchart of processing executed by the information transfer device 2500.

FIG. 26 is a flowchart of processing executed by the information transfer device 2500.

First, in step S2601, the stimulus device driving unit 2505 acquires a detection result signal transmitted from each of the contact detection units 2501 and 2502 and representing presence/absence of contact or a contact strength.

In step S2602, the stimulus device driving unit 2505 refers to each detection result signal acquired in step S2601. The stimulus device driving unit 2505 determines whether each detection result signal represents presence of contact or absence of contact. This determination is the same as in the first embodiment.

The processing branches based on the determination result.

When the stimulus device driving unit 2505 receives signals representing presence of contact from both the contact detection units 2501 and 2502, the process advances to step S2603. When the stimulus device driving unit 2505 receives a signal representing presence of contact from the contact detection unit 2501 and a signal representing absence of contact from the contact detection unit 2502, the process advances to step S2604. When the stimulus device driving unit 2505 receives a signal representing absence of contact from the contact detection unit 2501 and a signal representing presence of contact from the contact detection unit 2502, the process advances to step S2605. When the stimulus device driving unit 2505 receives signals representing absence of contact from both the contact detection units 2501 and 2502, the process advances to step S2606.

In step S2603, the stimulus device driving unit 2505 outputs the driving control signal representing the first driving pattern and that representing the second driving pattern to the stimulus presentation units 2503 and 2504, respectively. The stimulus presentation units 2503 and 2504 are driven based on the received driving control signals, respectively. The first driving pattern and the second driving pattern described in the above embodiments may be used. The process then returns to step S2601.

In step S2604, the stimulus device driving unit 2505 outputs the driving control signal representing the third driving pattern to the stimulus presentation unit 2503. The stimulus presentation unit 2503 is driven based on the received driving control signal, thereby producing a tactile stimulus which expresses transfer information. The third driving pattern described in the above embodiments may be used. The process then advances to step S2606.

In step S2606, the stimulus device driving unit 2505 outputs the driving control signal representing the fourth driving pattern to the stimulus presentation unit 2506. The stimulus presentation unit 2506 is driven based on the received driving control signal, thereby notifying the user of transfer information via a stimulus other than a tactile stimulus. Various kinds of fourth driving patterns are possible depending on the type of a stimulus to be given such as a visual stimulus or an auditory stimulus. The process then returns to step S2601.

In step S2605, the stimulus device driving unit 2505 outputs the driving control signal representing the third driving pattern to the stimulus presentation unit 2504. The stimulus presentation unit 2504 is driven based on the received driving control signal, thereby producing a tactile stimulus which expresses transfer information. The process then advances to step S2606.

By repeating the above-described processing, the information transfer device 2500 can notify the user of predetermined information via a tactile stimulus regardless of the user's way of holding the information transfer device.

The condition under which the stimulus presentation unit 2506 is used is not particularly limited, and the above description is a mere example.

The various stimulus patterns described in the above embodiments are merely examples. Which stimulus pattern should be used to make the user perceive transfer information is not particularly limited. The above embodiments may be combined or used without several technical elements as needed. That is, the aforementioned embodiments are based on the arrangements defined in the appended claims, and some of them have been described with several additional technical elements as needed. Various embodiments are available based on such arrangements. It is therefore possible to implement a variety of embodiments except those described above.

As is apparent from the above-described embodiments, it is possible to decide an information expression method (i.e., stimulus presentation method) to transfer information in accordance with the way of contact with the device. For example, information "right" is transferred using a stimulus presentation unit located relatively on the right side out of a plurality of stimulus presentation units in contact, instead of always using a specific stimulus presentation unit or stimulus presentation pattern. Alternatively, information "right" is expressed by generating a pattern that can be expressed only within the range of stimulus presentation units in contact. This enables to correctly and efficiently transfer information without the restriction "a body part needs to be as supposed in contact with a stimulus presentation unit". That is, the problem of the stimulus presentation techniques disclosed in patent references 1 and 2 and non-patent references 1 and 2, i.e., "correct information transfer may fail depending on how the user touches the device", can be solved by selecting an information expression method in accordance with the way of device touching.

<Modification>

In the above embodiments, the following units have been described as hardware.

Contact pattern recognition unit 102 and stimulus pattern generation unit 103 in FIG. 1
Stimulus device driving unit 1005 in FIG. 10
Stimulus device driving unit 1705 in FIG. 17
Stimulus device driving unit 2205 in FIG. 22
Stimulus device driving unit 2505 in FIG. 25

However, these units may be implemented as a computer program. For example, a computer program that causes the control unit (e.g., CPU or MPU) of the information transfer device to implement the functions of those units may be stored in the memory (e.g., RAM or ROM) of the information transfer device. In this case, the control unit can implement the operations of the above-described units by executing the computer program stored in the memory.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256638 filed Oct. 1, 2008, which is hereby incorporated by reference herein in its entirety.

What is claimed is:

1. An apparatus comprising:
    a plurality of sensor units which are attached to the apparatus in a predetermined arrangement pattern, wherein each of the sensor units is configured to detect contact thereupon by a human body;
    a plurality of presentation units which are attached to the apparatus in a predetermined arrangement pattern;
    a specifying unit configured to specify among said plurality of sensor units, a sensor unit that has detected direct/indirect contact thereupon by a human body; and a control unit configured to control the presentation unit based on the sensor unit specified by said specifying unit and a type of information to be presented.

2. The apparatus according to claim 1, wherein said plurality of sensor units are provided on or inside the apparatus.

3. The apparatus according to claim 1, further comprising an additional plurality of sensor units including a sensor unit configured to detect one of direct/indirect contact with a user and direct/indirect contact with a physical object gripped by the user.

4. The apparatus according to claim 1, wherein said plurality of presentation units are provided on or inside the apparatus.

5. The apparatus according to claim 1, wherein said specifying unit further configured to specify a set of presentation units respectively located adjacent to the sensor units specified by said specifying unit, and to specify, among the presentation units included in the specified set, a set of presentation units to be used to generate stimuli to express information to be presented to a user as a target of control by said control unit.

6. A non-transitory computer-readable storage medium storing a computer program which causes a computer to function as units included in the apparatus of claim 1.

7. An apparatus comprising:
a plurality of sensor units which are attached to the apparatus in a predetermined arrangement pattern, wherein each of the sensor units is configured to detect contact thereupon by a human body;
a plurality of presentation units which are attached to the apparatus in a predetermined arrangement pattern;
a specifying unit configured to specify, among said plurality of sensor units, a sensor unit that has detected direct/indirect contact thereupon by a human body; and
a control unit configured to control the presentation unit, based on the sensor unit specified by said specifying unit and a type of information to be presented, to generate a preset stimulus pattern to express information to be presented to a user.

8. The apparatus according to claim 7, wherein each of said plurality of sensor units and a corresponding one of said plurality of presentation units make a pair, and said control unit is further configured to control a presentation unit paired with the sensor unit specified by said specifying unit.

9. The apparatus according to claim 7, wherein said plurality of presentation units are divided into a plurality of groups, each group and a corresponding one of said plurality of sensor units make a pair, and said control unit is further configured to control a presentation unit included in a group paired with the sensor unit specified by said specifying unit.

10. The apparatus according to claim 7, wherein said plurality of sensor units are divided into a plurality of groups, each group and a corresponding one of said plurality of presentation units make a pair, and said control unit is configured to control a presentation unit paired with the sensor unit specified by said specifying unit.

11. The apparatus according to claim 7, further comprising a stimulus presentation unit to present a stimulus other than the tactile stimulus,
wherein if said specifying unit has been unable to specify a sensor unit, said control unit controls said stimulus presentation unit.

12. The apparatus according to claim 11, wherein said stimulus presentation unit is a unit to present at least a visual stimulus and an auditory stimulus.

13. The apparatus according to claim 7, wherein said control unit is configured to use the stimulus pattern corresponding to a combination of the sensor units specified by said specifying unit.

14. A non-transitory computer-readable storage medium storing a computer program which causes a computer to function as units included in the apparatus of claim 7.

15. A method performed by an apparatus comprising:
a specifying step of specifying, among a plurality of sensor units, a sensor unit that has detected direct/indirect contact thereupon by a human body, wherein said plurality of sensor units are attached to the apparatus, and wherein each of the sensor units is configured to detect contact thereupon by a human body; and
a control step of controlling the presentation unit, based on the sensor unit specified in the specifying step and a type of information to be presented, wherein a plurality of the presentation units are attached to the apparatus in a predetermined arrangement pattern.

16. A method performed by an apparatus comprising:
a specifying step of specifying, among a plurality of sensor units, a sensor unit that has detected direct/indirect contact thereupon by a human body, wherein said plurality of sensor units are attached to the apparatus in a predetermined arrangement pattern, and wherein each of the sensor units is configured to detect contact thereupon by a human body; and
a control step of driving and controlling the presentation unit, based on the sensor unit specified in the specifying step and a type of information to be presented, to generate a preset stimulus pattern to express information to be presented to a user, wherein a plurality of the presentation units are attached to the apparatus.

17. An apparatus comprising:
a plurality of sensor units which are attached to the apparatus in a predetermined arrangement pattern, wherein each of the sensor units is configured to detect contact thereupon by a human body;
a plurality of presentation units which are attached to the apparatus in a predetermined arrangement pattern;
a specifying unit configured to specify among said plurality of sensor units, a sensor unit that has detected direct/indirect contact thereupon by a human body; and
a control unit configured to control the presentation unit based on the sensor unit specified by said specifying unit.

18. A non-transitory computer-readable storage medium storing a computer program which causes a computer to function as units included in the apparatus of claim 17.

19. An apparatus comprising:
a plurality of sensor units which are attached to the apparatus in a predetermined arrangement pattern, wherein each of the sensor units is configured to detect contact thereupon by a human body;
a plurality of presentation units which are attached to the apparatus in a predetermined arrangement pattern;
a specifying unit configured to specify, among said plurality of sensor units, a sensor unit that has detected direct/indirect contact thereupon by a human body; and
a control unit configured to control the presentation unit, based on the sensor unit specified by said specifying unit, to generate a preset stimulus pattern to express information to be presented to a user.

20. A non-transitory computer-readable storage medium storing a computer program which causes a computer to function as units included in the apparatus of claim 19.

21. A method performed by an apparatus comprising:
a specifying step of specifying, among a plurality of sensor units, a sensor unit that has detected direct/indirect contact thereupon by a human body, wherein said plurality of sensor units are attached to the apparatus, and wherein each of the sensor units is configured to detect contact thereupon by a human body; and
a control step of controlling the presentation unit, based on the sensor unit specified in the specifying step, wherein a plurality of the presentation units are attached to the apparatus in a predetermined arrangement pattern.

22. A method performed by an apparatus comprising:
a specifying step of specifying, among a plurality of sensor units, a sensor unit that has detected direct/indirect contact thereupon by a human body, wherein said plurality of sensor units are attached to the apparatus in a predetermined arrangement pattern, and wherein each of the sensor units is configured to detect contact thereupon by a human body; and
a control step of driving and controlling the presentation unit, based on the sensor unit specified in the specifying step, to generate a preset stimulus pattern to express information to be presented to a user, wherein a plurality of the presentation units are attached to the apparatus.

* * * * *